United States Patent [19]

Motoyama et al.

[11] Patent Number: 5,446,837
[45] Date of Patent: * Aug. 29, 1995

[54] METHOD AND SYSTEM TO PROCESS RESOURCES IN A DOCUMENT PROCESSING LANGUAGE

[75] Inventors: Tetsuro Motoyama; Yueh-Lin Chang, both of San Jose, Calif.

[73] Assignees: Ricoh Company, Ltd., Tokyo, Japan; Ricoh Corporation, San Jose, Calif.

[ * ] Notice: The portion of the term of this patent subsequent to May 16, 2012 has been disclaimed.

[21] Appl. No.: 119,930

[22] Filed: Sep. 10, 1993

Related U.S. Application Data

[63] Continuation-in-part of Ser. No. 87,571, Jul. 2, 1993, which is a continuation-in-part of Ser. No. 931,808, Aug. 11, 1992, Pat. No. 5,416,896, which is a continuation-in-part of Ser. No. 876,601, Apr. 30, 1992, Pat. No. 5,319,748, and Ser. No. 879,251, Apr. 30, 1992, Pat. No. 5,325,484.

[51] Int. Cl.[6] .............................................. G06F 17/22
[52] U.S. Cl. ...................................... 395/145; 395/148
[58] Field of Search ............... 395/145, 148, 162, 116; 364/419.07, 419.08, 419.11, 419.13, 419.12, 419.19

[56] References Cited

U.S. PATENT DOCUMENTS

| | | | |
|---|---|---|---|
| 5,165,014 | 11/1992 | Vassar | 395/112 |
| 5,247,437 | 9/1993 | Vale et al. | 364/419.19 |
| 5,295,236 | 3/1994 | Bjorge et al. | 395/134 |
| 5,319,748 | 6/1994 | Motoyama | 395/162 |
| 5,325,484 | 6/1994 | Motoyama | 395/162 |

OTHER PUBLICATIONS

Tennent, Principles of Programming Languages, 1981, pp. 15 to 21, 65 to 73, 95 to 146 wirth Programming Modula-2, 1985, pp. 64 to 65.
ISO/IEC DIS 10180, Information Processing-Text Communication-Standard Page Description Language; Draft International Standard 1991-03, 1991.
"Postscript Language Reference Manual", Second Edition, Adobe Systems Incorporated, Chapter 3, Section 3.9 (Names Resources), pp. 85-99.

*Primary Examiner*—Heather R. Herndon
*Assistant Examiner*—Anton W. Fetting
*Attorney, Agent, or Firm*—Oblon, Spivak, McClelland, Maier, & Neustadt

[57] ABSTRACT

A method and apparatus for processing resources in a hierarchically structured page description language. The resource must first be defined before it can be used. The definition of a resource is contained in a resource specification. The resource is defined by creating a linked list resource definition data structure which contains a reference to a resource specification and a reference to a subsequent resource definition data structure. Alternatively, the resource can be defined by downloading a predefined resource from non-volatile memory and reference is made to the downloaded resource specification in a AVAILABLE RESOURCE TABLE. It is also possible for default resources of the system to be found in the AVAILABLE RESOURCE TABLE. After a resource is defined, it must be declared. The declaration process uses a resource declaration data structure which has a reference to a defined resource specification and a reference to a subsequent resource declaration data structure.

16 Claims, 24 Drawing Sheets

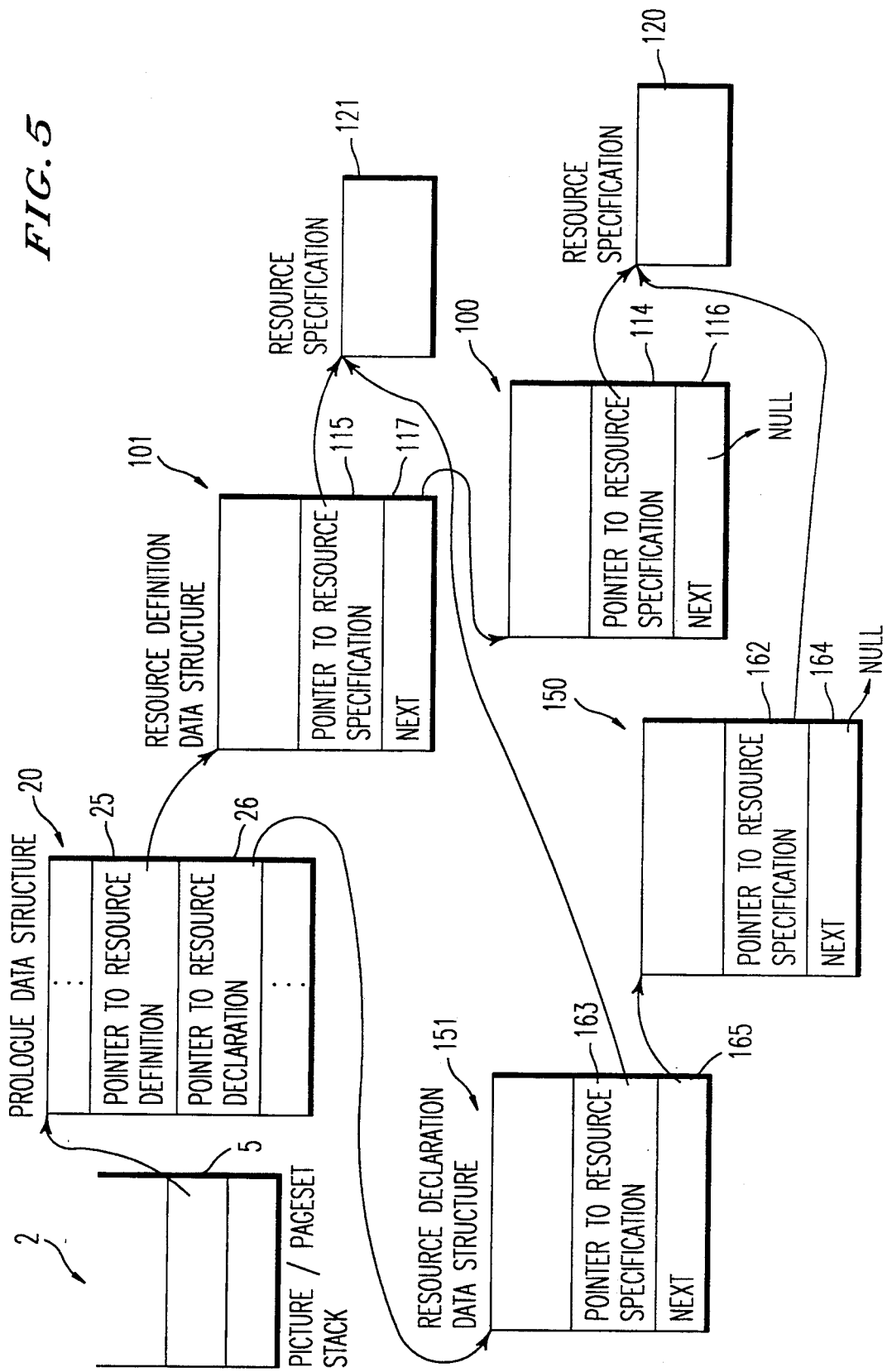

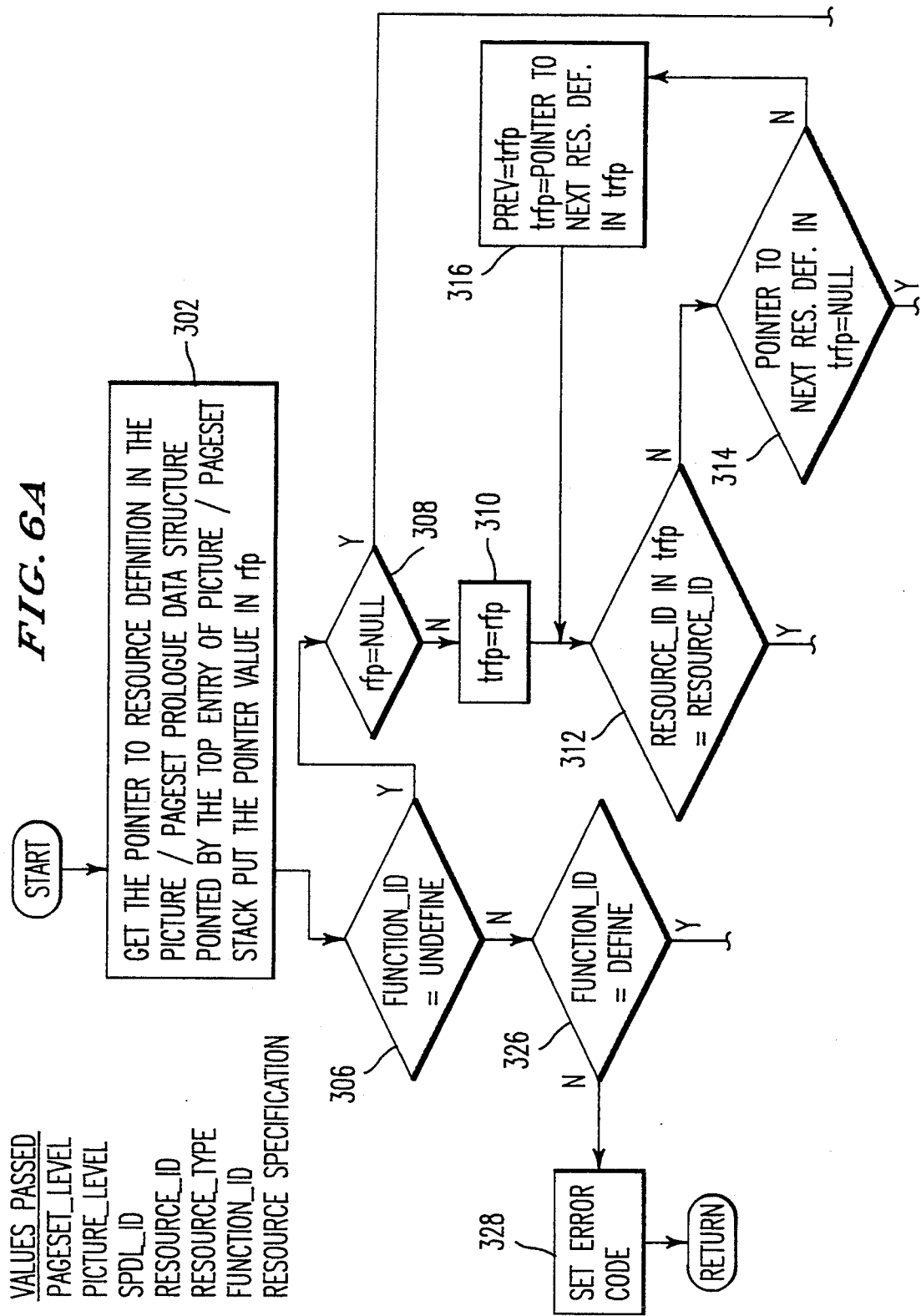

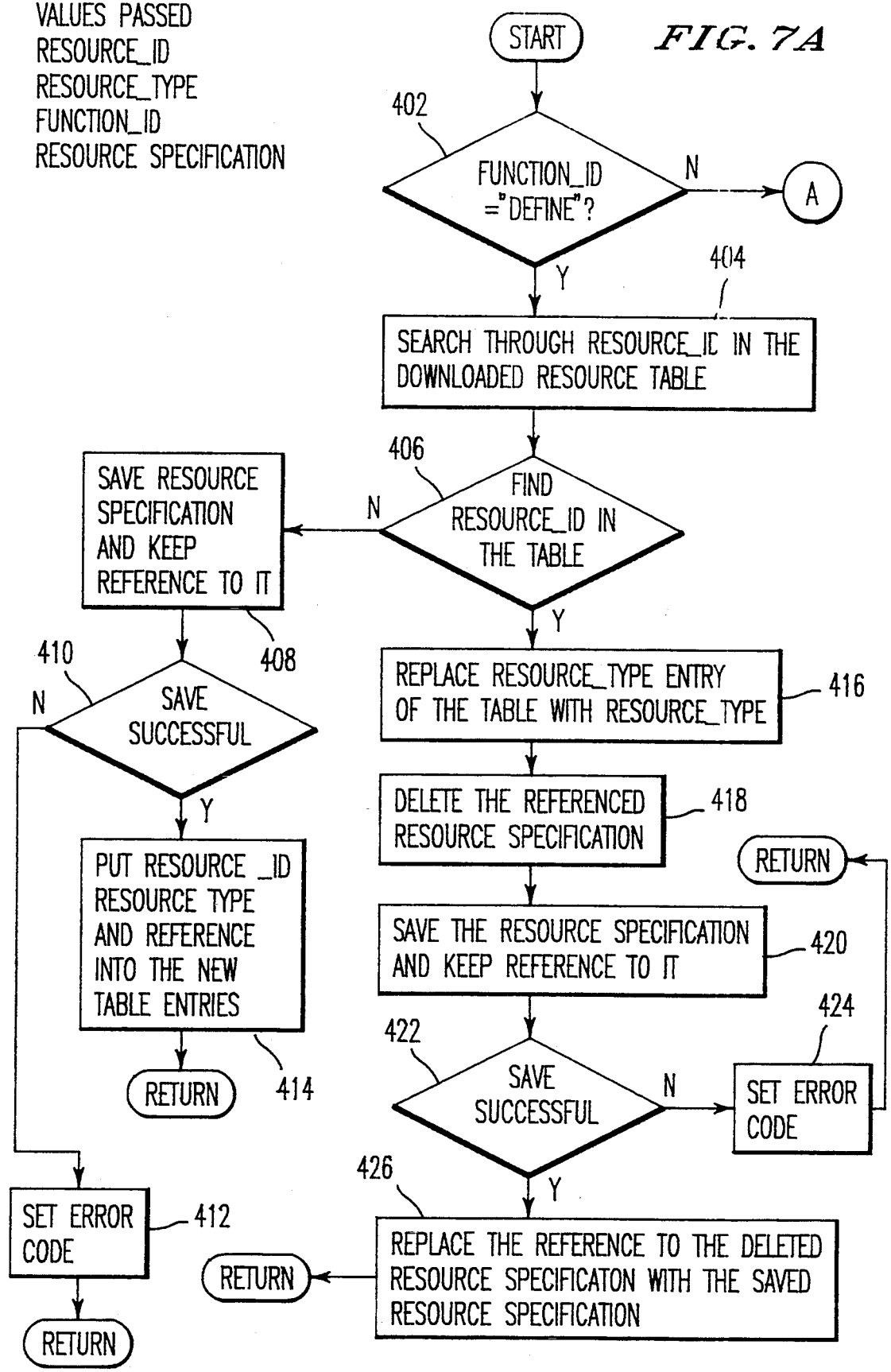

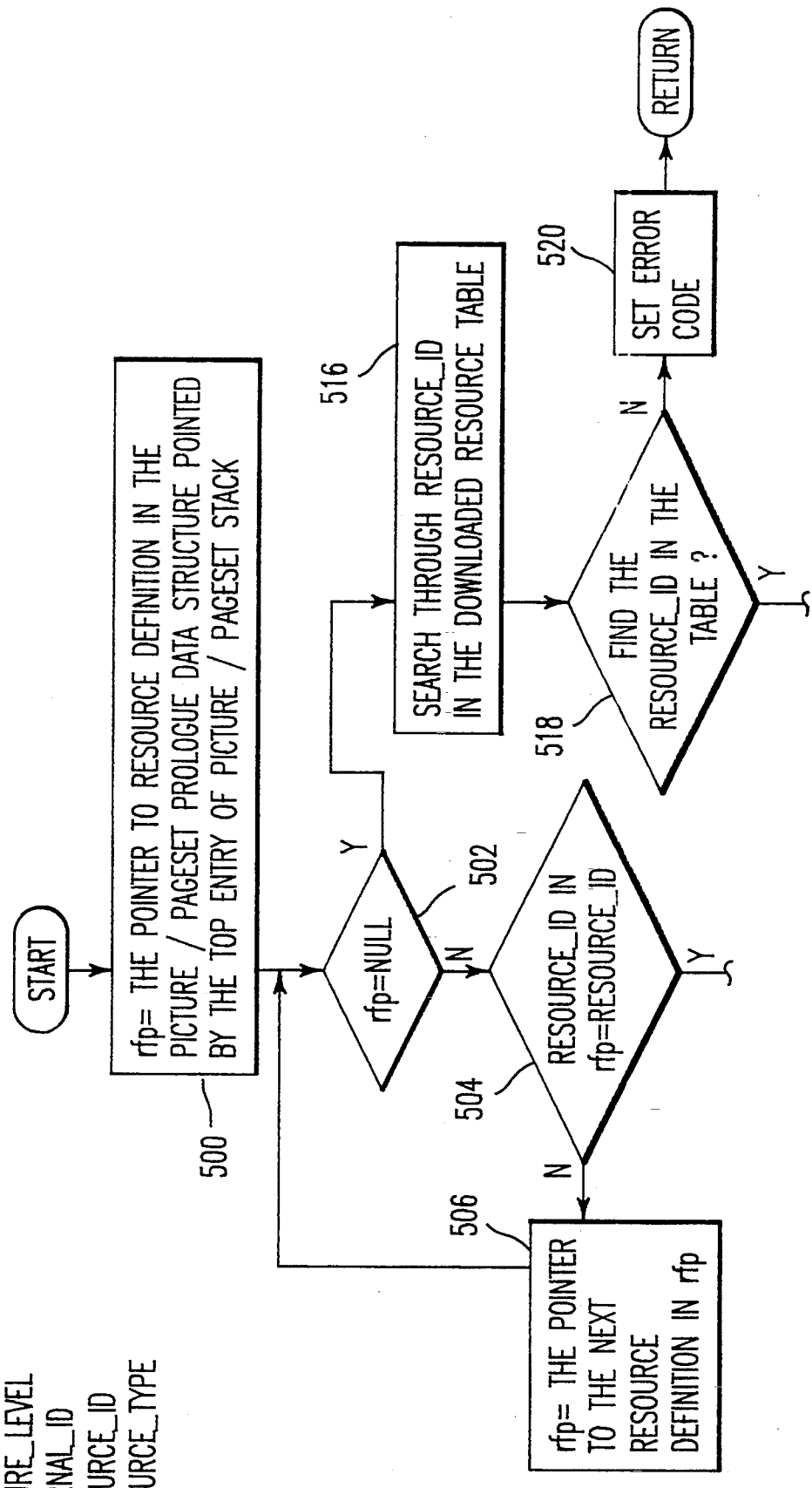

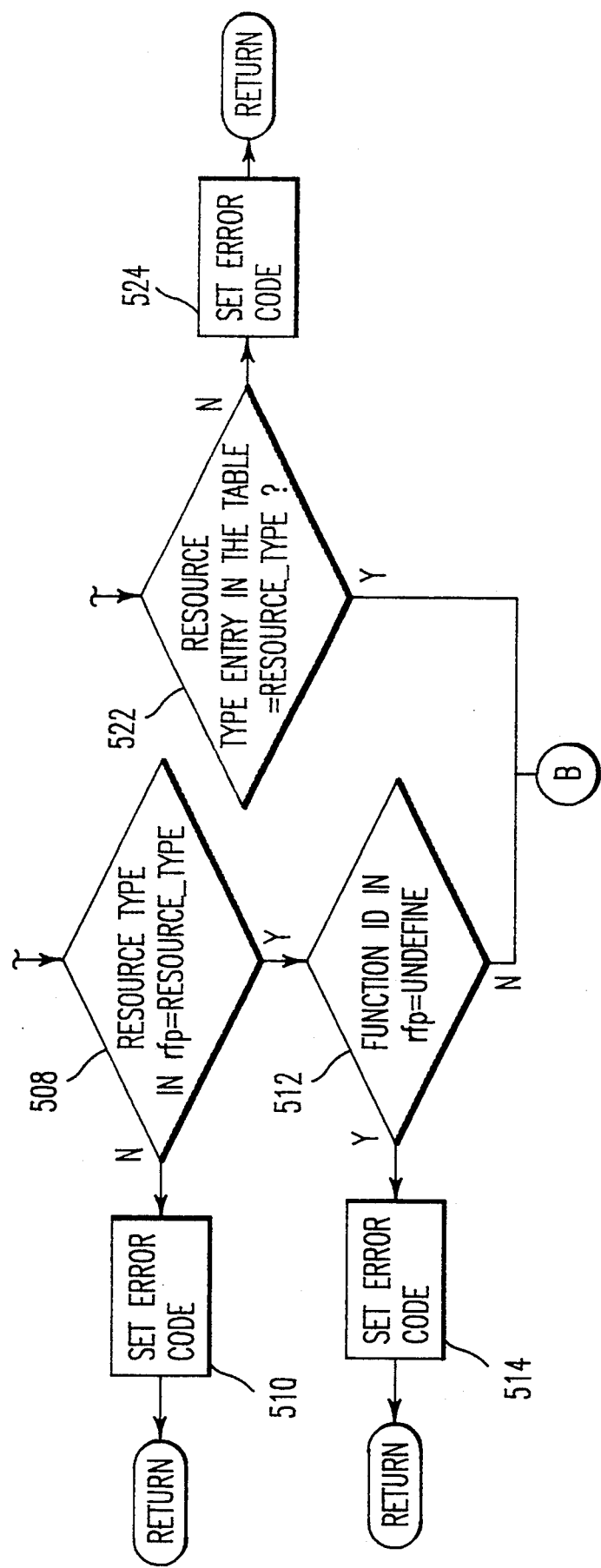
FIG. 8A(2)

FIG. 9A

| | |
|---|---|
| SPDL | 602 |
|     RESOURCE DEFINITION | 604 |
|         RESOURCE ID | 606 |
|         RESOURCE TYPE | 608 |
|         RESOURCE SPECIFICATION | 610 |

FIG. 9B

| | |
|---|---|
| SPDL | 611 |
|   PAGESET | 612 |
|     PROLOGUE | 614 |
|       RESOURCE | 616 |
|           RESOURCE DECLARATION | 618 |
|           RESOURCE DEFINITION | 620 |
|           RESOURCE DECLARATION | 622 |
|           RESOURCE DEFINITION | 624 |
|     PAGESET BODY | 626 |
|       PICTURE | 628 |
|         RESOURCE | 630 |
|             RESOURCE DEFINITION | 632 |
|             RESOURCE DEFINITION | 634 |
|             RESOURCE DECLARATION | 636 |

⋮

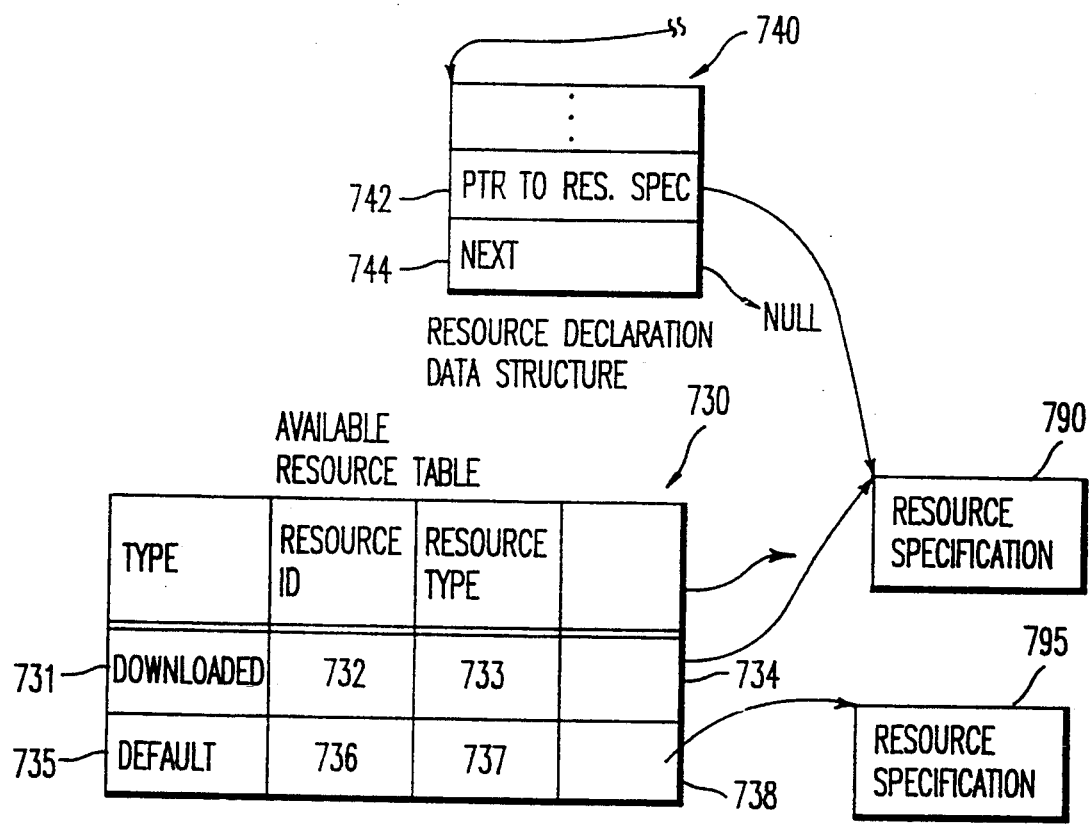
FIG. 10E(1)

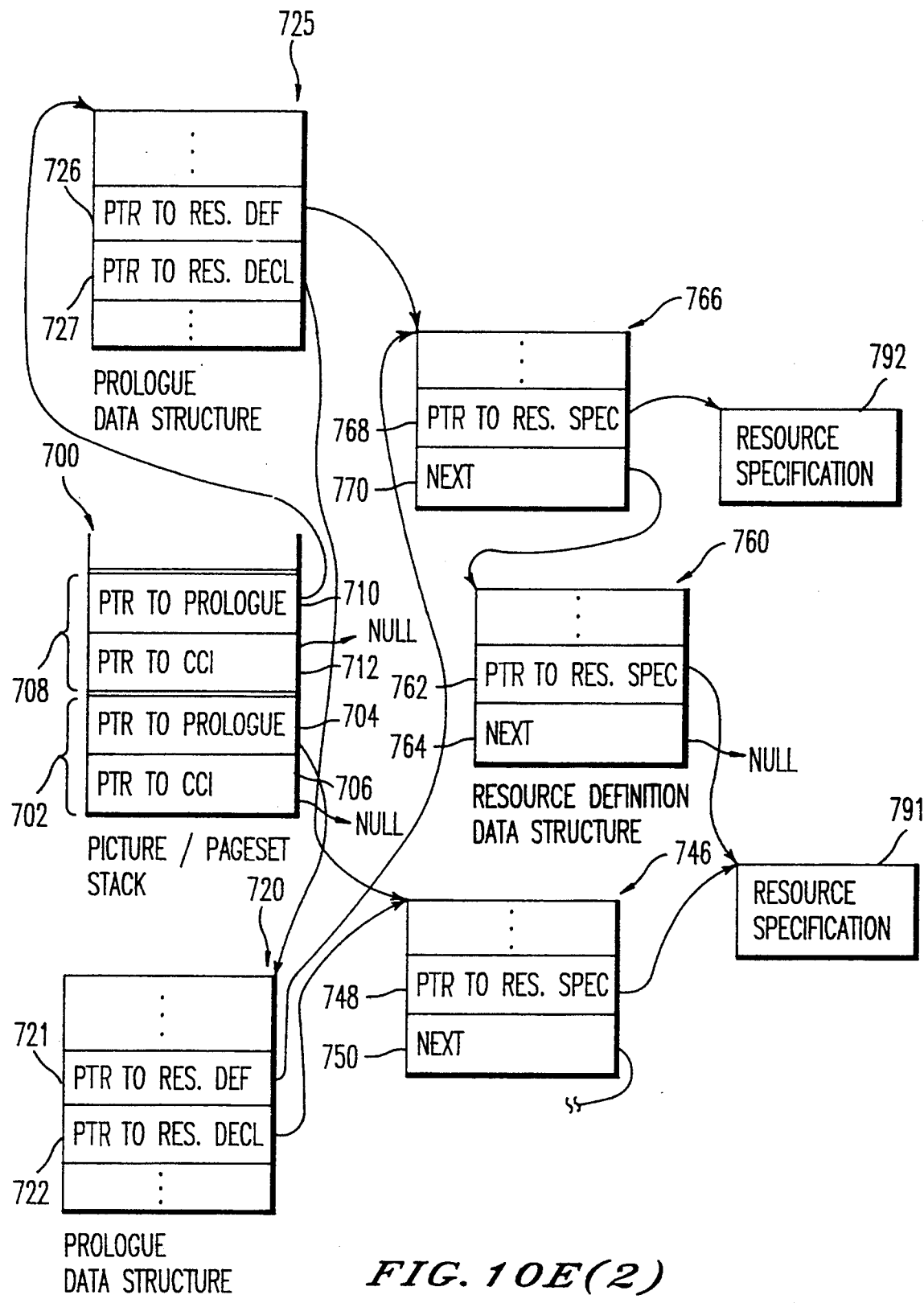
FIG. 10E(2)

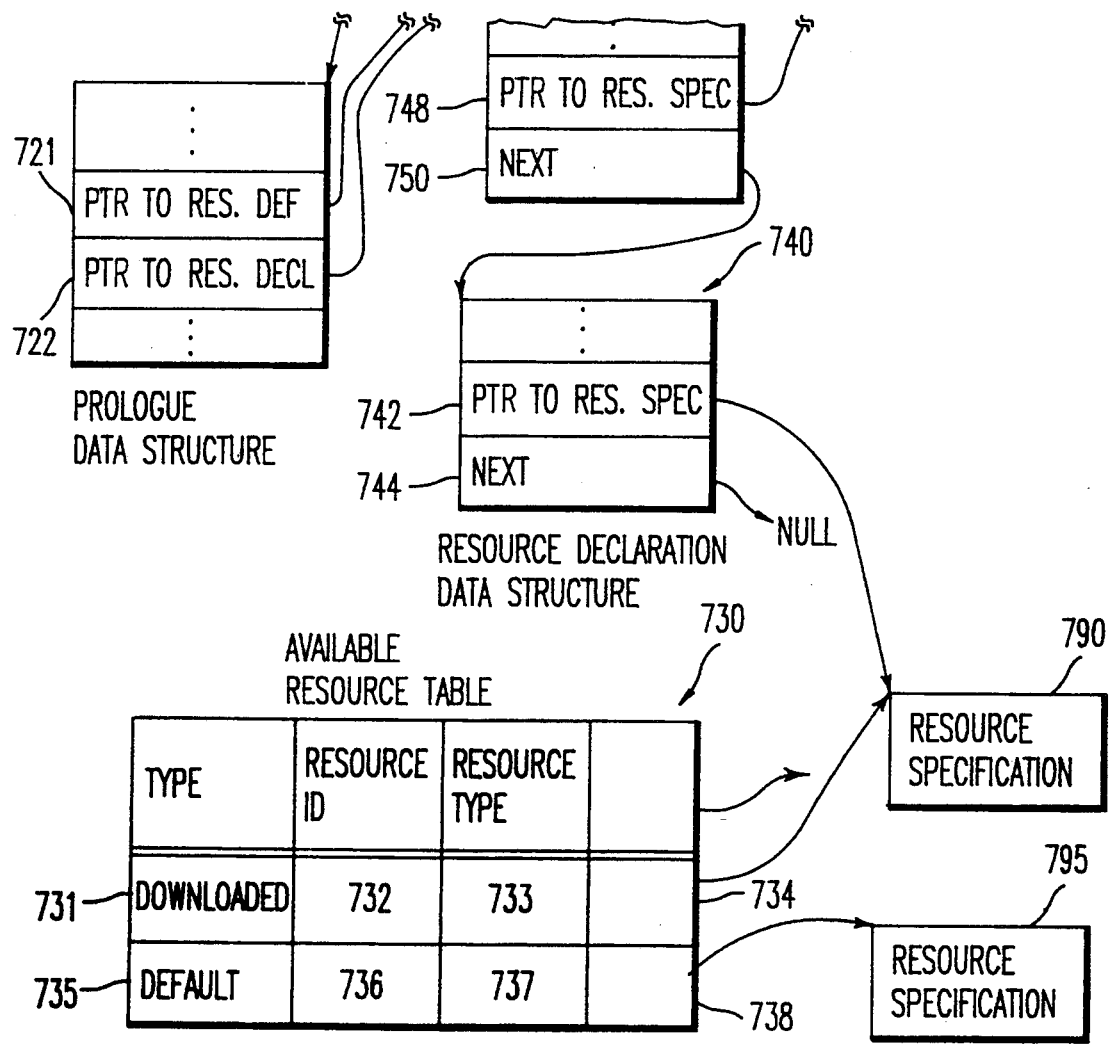
FIG. 10F(1)

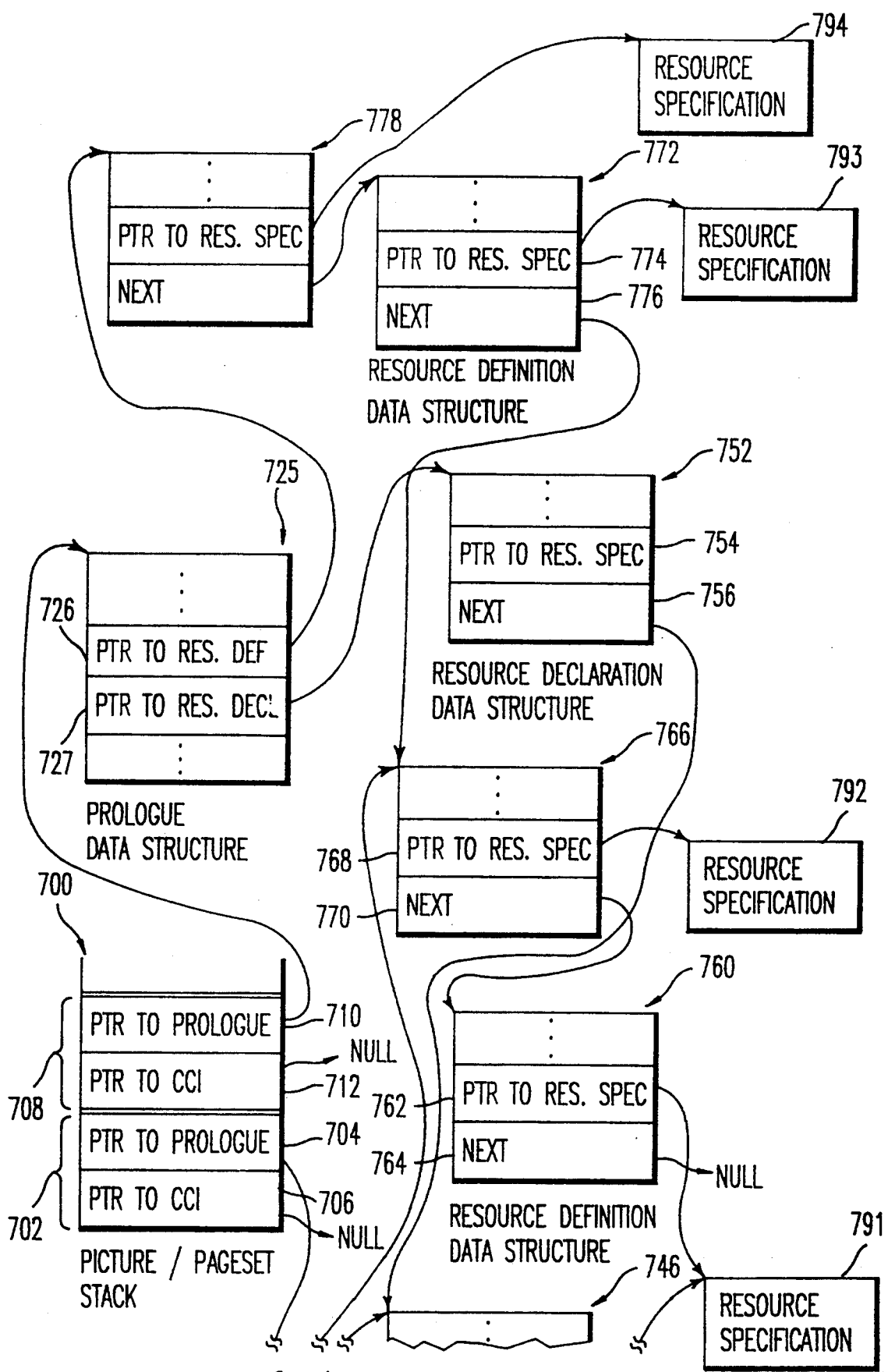
FIG. 10F(2)

METHOD AND SYSTEM TO PROCESS RESOURCES IN A DOCUMENT PROCESSING LANGUAGE

CROSS-REFERENCE TO RELATED APPLICATIONS

This application is a continuation-in-part of U.S. patent application Ser. No. 08/087,571 filed on Jul. 2, 1993, and entitled "Method and System to Handle Context of Interpretation in a Document Processing Language", which is a continuation-in-part of U.S. patent application Ser. No. 07/931,808 filed on Aug. 11, 1992, now U.S. Pat. No. 5,416,896, and entitled "A Method and System to Handle Dictionary Generation and Context Declaration in a Document Processing Language," which is a continuation-in-part of U.S. patent applications Ser. Nos. 07/876,601, now U.S. Pat. No. 5,319,748, and 07/879,251, now U.S. Pat. No. 5,325,484, both filed on Apr. 30, 1992, and entitled "Method and Apparatus to Manage Picture and Pageset for Document Processing" and "Method and System to Handle Inclusion of External Files into a Document Processing Language," respectively.

BACKGROUND OF THE INVENTION

1. Field of the Invention

This invention relates generally to the computer control printing, displaying, or other presentation of documents which may have text, graphical components, and/or images. This invention is more particularly related to a system and method for defining and using resources in a document processing language.

2. Discussion of the Background

A Standardized Page Description Language ("SPDL") has been proposed and is being developed as an international standard by the International Standards Organization ("ISO"). The draft is known as ISO/IEC DIS 10180, labeled "Information Processing Text-Communication Standard Page Description Language" and is available through the American National Standards Institute ("ANSI") in New York. The current version of this draft is dated March, 1991.

Chapter 7 of the current version of ISO/IEC DIS 10180 pertains to resources in the SPDL. A resource is defined as an information object which may be available in the environment of the presentation process. The resources defined by the proposed international standard include resources related to fonts, glyphs, color spaces, data sources, filters, patterns and forms. The presentation process refers to the processing of a document so that it can be presented. The word "presented" includes any manner of displaying or printing or transmitting a document for display or printing and includes displaying on a CRT, printer, fax machine, or any type of presentation device.

While ISO/IEC DIS 10180 describes the resources and how they are used, it does not describe how the processing of resources is to be implemented.

PostScript ® is a page description language developed by Adobe Systems Inc. Section 3.9 of "PostScript Language Reference Manual" second edition, 1990, describes how resources are used in PostScript, Level 2. However, SPDL has a hierarchical structure whereas PostScript does not. Accordingly, the processing of resources in PostScript may not be appropriate for use in a hierarchical language such as SPDL.

Interpress ® is a page description language developed by Xerox. However, Interpress does not have different processes for distinguishing resources, putting the resources into the processing environment, and the process to make the resources in the environment available to the content of the document.

SUMMARY OF THE INVENTION

Accordingly, one object of this invention is to provide a method and apparatus for the handling of resources within a hierarchical page description language.

It is another object of this invention to provide a method and apparatus to handle the defining of a resource.

It is a further object of this invention to provide an apparatus and methodology for allowing predefined resources to be downloaded instead of defining them within the page description language document.

It is yet another object of this invention to handle the declaration of the resources after they have been defined so that they are available during the presentation process.

These and other objects are achieved according to the present invention by providing an efficient method and apparatus for processing page description languages, such as the language defined in ISO/IEC DIS 10180, for example. A picture/pageset stack is provided to keep track of each hierarchical level within a document. Each level of the picture/pageset stack contains two entries; a pointer to a picture/pageset prologue data structure (referred to hereinafter as a prologue data structure) and a pointer to a current context of interpretation data structure (hereinafter referred to as a CCI data structure).

This prologue data structure contains data pertaining to the hierarchical level being processed and pointers to linked list data structures which keep track of the state of the presentation device. Two pointers in the prologue data structure are a Pointer to Resource Definition and a Pointer to Resource Declaration. These pointers point to a resource definition data structure and a resource declaration data structure, respectively. These data structures are used to keep track of the information used when defining and declaring resources.

The CCI data structure is a data structure used when processing a tokensequence element of the data structure. A tokensequence element contains the content in SPDL which contains specific tokens or commands for defining images along with necessary operators. The CCI data structure contains a pointer to a resource declaration which points to a resource declaration data structure in a similar manner as the pointer to resource declaration in the prologue data structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 illustrates an example of a picture/pageset stack having a prologue data structure pointing to two resource definition data structures and two resource declaration data structures;

FIGS. 6A and 6B illustrate a process for handling a resource definition when the resource definition is not at the highest hierarchical level;

FIGS. 7A and 7B illustrate a flowchart for handling a resource definition when the resource definition is at the highest hierarchical level.

FIGS. 9A and 9B illustrate program listings of SPDL structure elements;

FIGS. 10A–10F(2) illustrate the data structures created by the listing of FIG. 9;

DETAILED DESCRIPTION OF THE PREFERRED EMBODIMENTS

Figure 1:
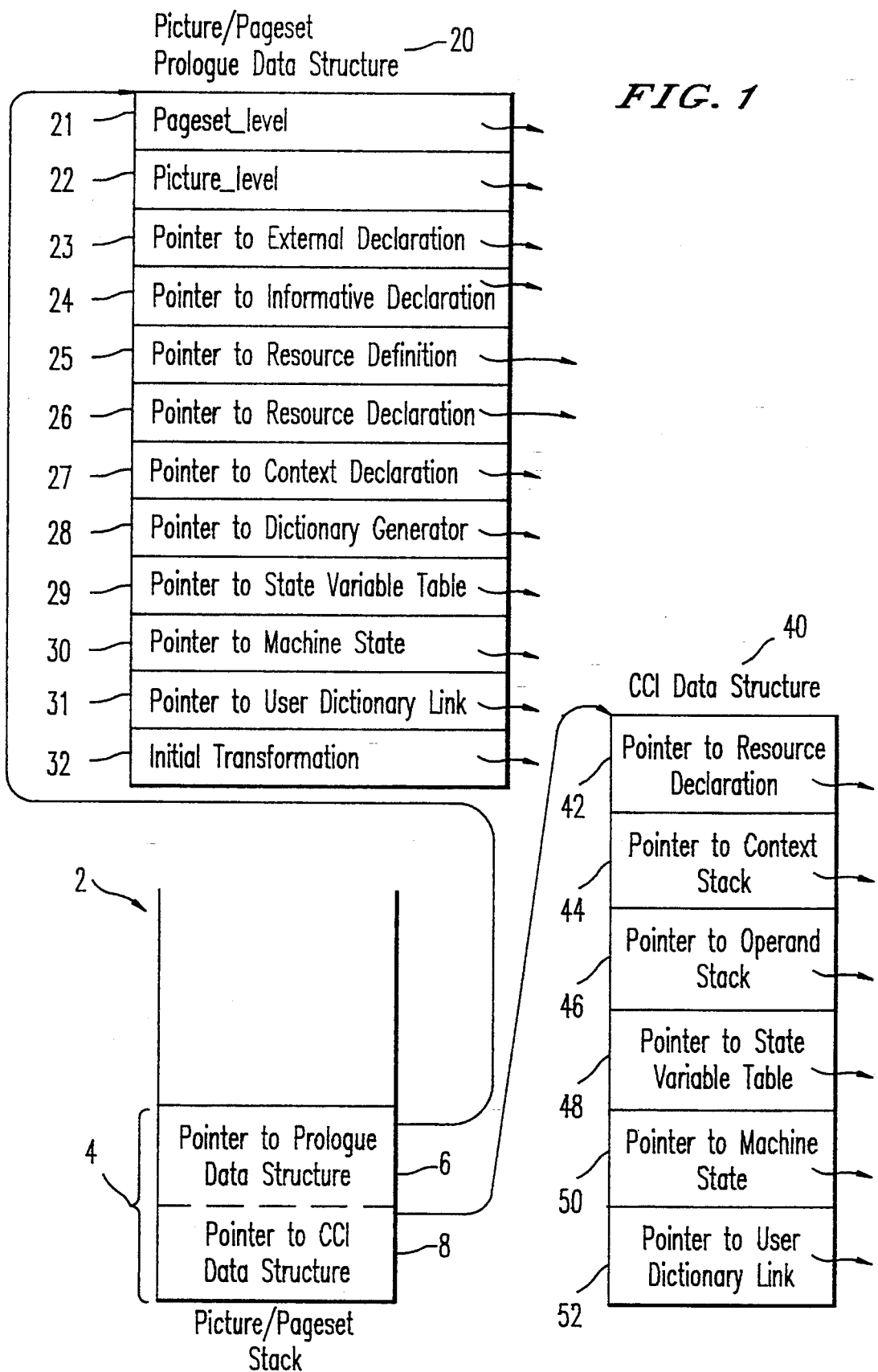
FIG. 1 illustrates a picture/pageset stack having pointers to a prologue data structure and a CCI data structure.

Referring now to the drawings, wherein like reference numerals designate identical or corresponding parts throughout the several views, and more particularly to FIG. 1 thereof, there is illustrated a picture/pageset stack 2 having one entry 4 containing a pointer 6 to a picture/pageset prologue data structure 20 (hereinafter referred to as a prologue data structure) and a pointer 8 to CCI data structure 40. A complete explanation of the use of the picture/pageset stack, prologue data structure, and CCI data structure can be found in commonly owned co-pending U.S. patent application Ser. No. 08/087,571, filed on Jul. 2, 1993, and entitled "Method and System to Handle Context of Interpretation in a Document Processing Language," which is incorporated herein by reference. However, for clarity sake, a brief explanation of the use of these data structures follows.

The data structures illustrated in FIG. 1 are created during the processing of a hierarchically structured page description language. Each time a new hierarchical level of a document is processed, an additional entry is pushed onto the picture/pageset stack. If the hierarchical level being processed contains one or more hierarchical levels within, for each hierarchical level, an additional entry is pushed onto the picture/pageset stack having a pointer to a prologue data structure and a pointer to a CCI data structure. When the hierarchical level being processed ends, the entry on the picture/pageset stack for the hierarchical level is popped off.

The prologue data structure is used to keep track of the various elements used during the presentation of a document. The presentation of a document refers to a process used for processing a page description language file for displaying on any type of a device or transmitting to another device. These display devices could include for example CRTs, printers, facsimile machines, or any other device which could display, present or store an image.

At the beginning of the processing of a document, a prologue data structure is created having default values and a pointer to the CCI data structure points to null.

The CCI data structure is created and used during the processing of a content portion of a document which contains tokensequence elements. When a content portion of the document is encountered, a CCI data structure is created by copying the values in the prologue data structure to their corresponding entries in the CCI data structure. When a new hierarchical level is encountered, the pageset level and picture level are incremented and placed in the new prologue data structure and the pointers of the higher hierarchical level are copied to the pointers in the newly created prologue data structure. There is no need at this time to create a new CCI data structure until a tokensequence element in the new hierarchical level is encountered.

Figure 2:
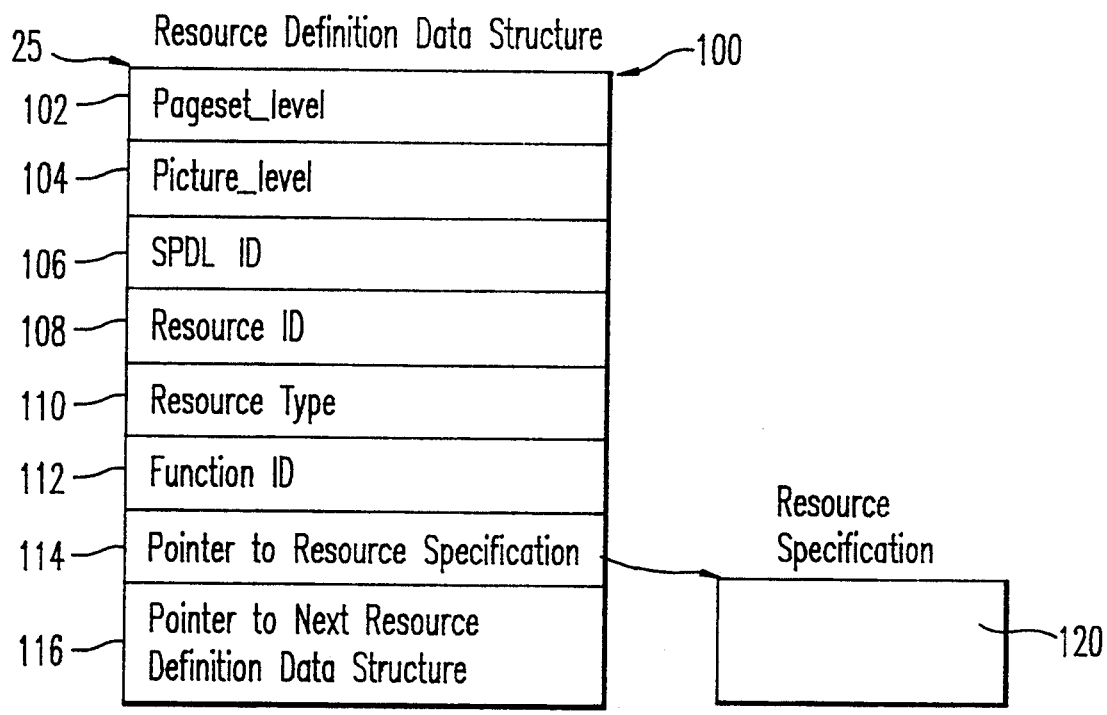
FIG. 2 illustrates a resource definition data structure.

FIG. 2 illustrates a resource definition data structure 100. The resource definition data structure 100 is pointed to by the pointer to resource definition 25 of the prologue data structure 20.

The resource definition data structure 100 contains entries PAGESET_LEVEL 102 and PICTURE_LEVEL 104. The PAGESET_LEVEL 102 and PICTURE_LEVEL 104 indicate the pageset hierarchical level and picture hierarchical level, at which a resource was defined. When the PAGESET_LEVEL or PICTURE_LEVEL ends, the hierarchical structure of SPDL permits the resource definition data structure to be deleted.

Entry 106 of the resource definition data structure contains the SPDL ID. The SPDL ID 106 indicates that the resource definition data structure 100 defines an SPDL resource. RESOURCE ID 108 contains the name of the resource being defined. RESOURCE TYPE 110 indicates the type of resource being defined. Exemplary resource types permitted by SPDL, at the time of this writing, include FONT OBJECT, GLYPH INDEX MAP, FONT INDEX MAP, COLOR SPACE, DATA SOURCE, FILTER, PATTERN and FORM. Other resource types are contemplated and this invention allows for other resource types to be added.

FUNCTION ID 112 contains the function identifier as required by SPDL. The FUNCTION ID shall be DEFINE if a resource is being defined or UNDEFINE if the resource is being deleted.

The POINTER TO RESOURCE SPECIFICATION 114 points to RESOURCE: SPECIFICATION 120. The RESOURCE SPECIFICATION 120 contain the information which actually defines or describes the resource. A detailed description of the RESOURCE SPECIFICATION is not necessary for a understanding of the present invention. However, the RESOURCE SPECIFICATION, in this preferred embodiment, conforms to known SPDL requirements.

The POINTER TO NEXT RESOURCE DEFINITION DATA STRUCTURE 116 points to a resource definition data structure having the same structure as resource definition data structure 100. This allows a plurality of resource definition commands to be used in an SPDL document. As will be explained later, after the first resource definition data structure is defined, new resource definition data structures are pointed to directly by the prologue data structure as the POINTER TO NEXT RESOURCE DEFINITION DATA STRUCTURE 116 of the new resource definition data points to the previously created resource definition data structure.

Figure 3:
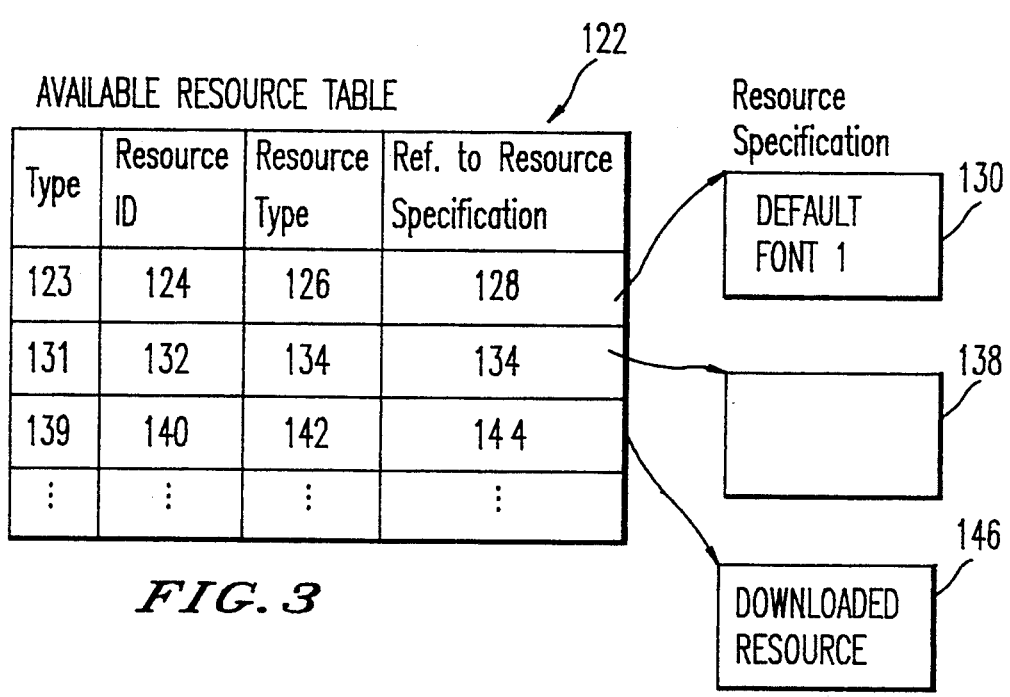
FIG. 3 illustrates an available resource table.

FIG. 3 illustrates an AVAILABLE RESOURCE TABLE 122 which is used to keep track of system resources which are not defined using the RESOURCE DEFINITION DATA STRUCTURE. The available resources can be default resources which come from the SPDL system such as default fonts or certain filters. The default resources should be stored in a permanent storage device such as a ROM. Alternatively, the resources can be downloaded from a storage device. Resources to be downloaded can be stored in any type of nonvolatile, semi-permanent storage device such as a hard disk, DRAM having a continuous power supply, flash RAM, or CMOS RAM with a battery, for example. If a system allows the downloaded resources to be erased at power off, the downloaded resources can be stored in RAM. The AVAILABLE RESOURCE TABLE 122, for each default and downloaded resource, contains a type which denotes if the resource is a default resource or a downloaded resource, a RESOURCE ID which is a name of the resource, a RESOURCE TYPE which describes the type of resource, and a reference to a RESOURCE SPECIFICATION which can point to a RESOURCE SPECIFICATION defining the resource. The Resource Types to be specified are Dictionary, Font Resource, Glyph Index Map, Font Index Map, Color Space, Data Source, Pattern, and Filter. For example, when a dictionary is downloaded to the system, TYPE is set to "downloaded," RESOURCE TYPE is set to Dictionary and the reference to RESOURCE SPECIFICATION is set to point to the downloaded dictionary data structure. For example, the top entry in the AVAILABLE RESOURCE TABLE has a TYPE 123, RESOURCE ID 124, a RESOURCE TYPE 126, and a reference to RESOURCE SPECIFICATION 128 which points to a RESOURCE SPECIFICATION 130. A complete description of the use of the AVAILABLE RESOURCE TABLE is given below.

Figure 4:
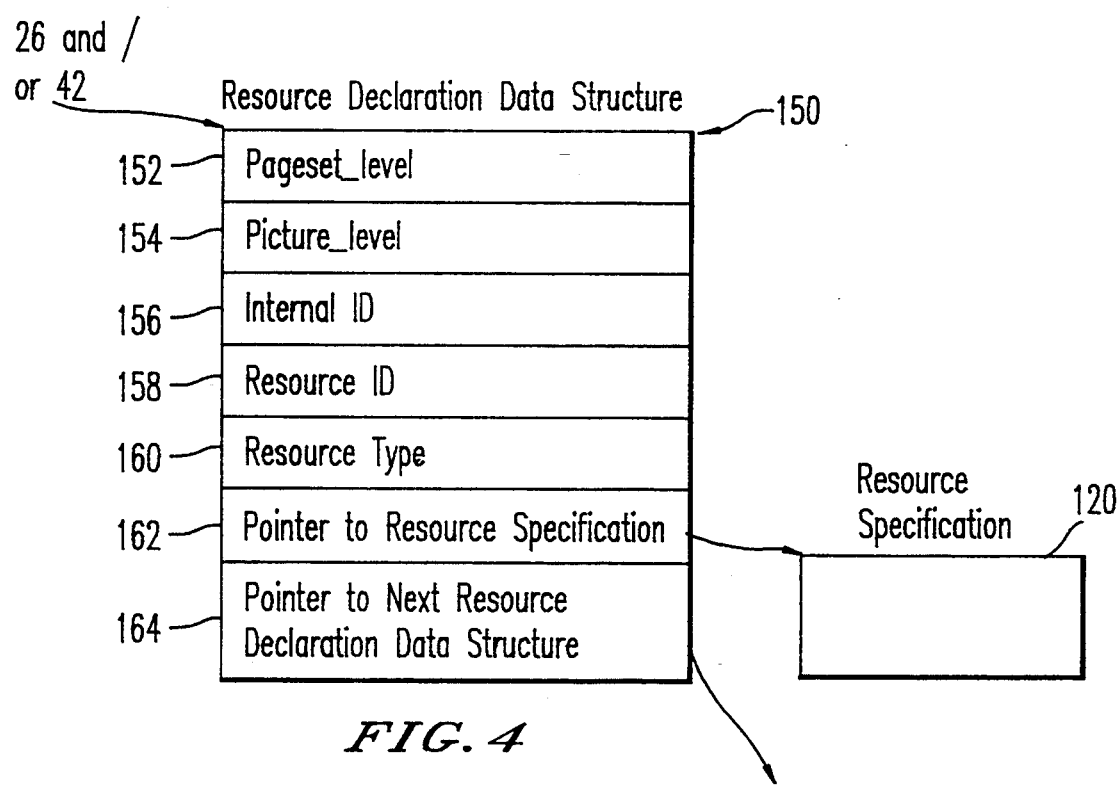
FIG. 4 illustrates a resource declaration data structure.

FIG. 4 illustrates a RESOURCE DECLARATION DATA STRUCTURE 150. The RESOURCE DECLARATION DATA STRUCTURE is used to keep track of declared resources. After a resource is defined by a resource definition command within an SPDL document it must be declared before it can be used by issuing a resource declaration command. The RESOURCE DECLARATION DATA STRUCTURE 150 can be pointed to by the POINTER TO RESOURCE DECLARATION 26 of the PROLOGUE DATA STRUCTURE 20 and/or the POINTER TO RESOURCE DECLARATION 42 of the CCI data structure 40.

The RESOURCE DECLARATION DATA STRUCTURE 150 contains PAGESET_LEVEL 152 and PICTURE_LEVEL 154, indicating the pageset level and picture level respectively at which the resource was declared.

An INTERNAL ID 156 is used by the content such as a tokensequence within an SPDL document to identify the resource. The RESOURCE ID 158 and the RESOURCE TYPE 160 are used to identify the RESOURCE SPECIFICATION 170 pointed to by a previously created resource definition data structure. The POINTER TO RESOURCE SPECIFICATION 162 points to the RESOURCE SPECIFICATION 170 and the POINTER TO NEXT RESOURCE DECLARATION DATA STRUCTURE 164 points to a subsequent resource declaration data structure, if any, or else points to null.

FIG. 5 illustrates the various data structures created by an SPDL document having two resource definitions and two resource declarations and the interrelations of the data structure. FIG. 5 illustrates PICTURE/PAGESET STACK 2 having an entry 5 pointing to PROLOGUE DATA STRUCTURE 20 having a POINTER TO RESOURCE DEFINITION 25 and a POINTER TO RESOURCE DECLARATION 26. The POINTER TO RESOURCE DEFINITION 25 points to a RESOURCE DEFINITION DATA STRUCTURE 101 having a RESOURCE SPECIFICATION 121. There is a previously created RESOURCE DEFINITION DATA STRUCTURE 100 which points to a RESOURCE SPECIFICATION 120. The RESOURCE DEFINITION DATA STRUCTURE 100 and a subsequent RESOURCE DEFINITION command in the document causes the creation of RESOURCE DEFINITION DATA STRUCTURE 101 which is between the PROLOGUE DATA STRUCTURE 20 and RESOURCE DEFINITION DATA STRUCTURE 100.

The PROLOGUE DATA STRUCTURE 20 has a POINTER TO RESOURCE DECLARATION 26 which points to RESOURCE DECLARATION DATA STRUCTURE 151. RESOURCE DEFINITION DATA STRUCTURE 151 has a POINTER TO RESOURCE SPECIFICATION 163 which points to RESOURCE SPECIFICATION 121. The RESOURCE DECLARATION DATA STRUCTURE 151 also has a pointer 165 to a RESOURCE DECLARATION DATA STRUCTURE 150 which was created before the RESOURCE DECLARATION DATA STRUCTURE 151.

Figure 6B:
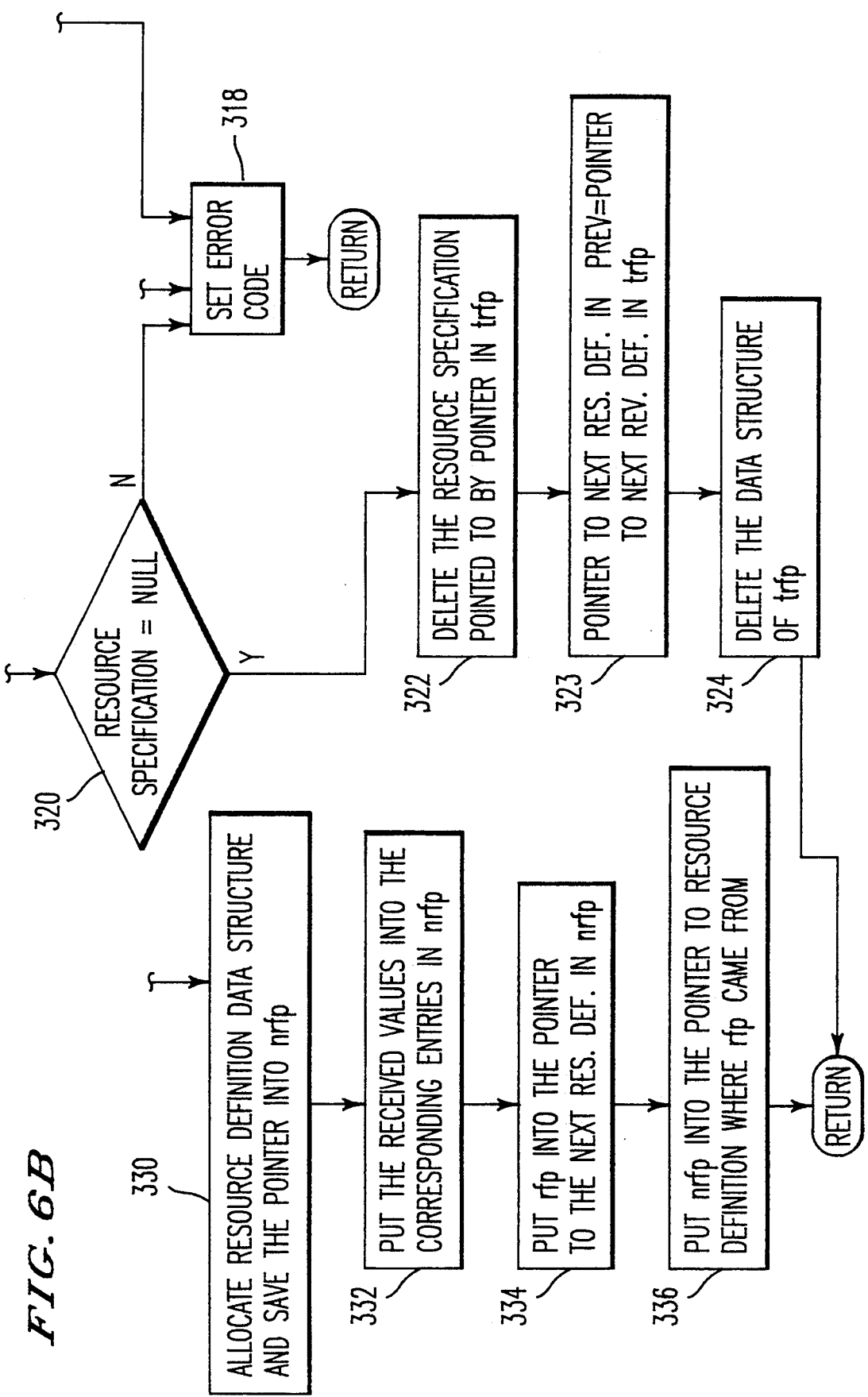

FIGS. 6A and 6B illustrate the process for handling a resource definition when the resource definition is not at the highest structure level but is, for example, subordinate to a DOCUMENT structure element 20. This process handles defining the resource instead of the resource being downloaded. When a resource definition structure element is encountered, a parsing process for an input SPDL data stream identifies the resource definition structure element, identifies the SPDL ID, the RESOURCE ID, the RESOURCE TYPE, the FUNCTION ID, and the RESOURCE SPECIFICATION. Then the parsing process calls the process illustrated in FIGS. 6A and 6B and passes the variables which are used in defining resources. After calling the process in FIG. 6A and passing the necessary values, step 302 determines the value of the pointer to the resource definition in the prologue data structure of the top entry in the picture/pageset stack and puts the value of the pointer of the resource definition into a pointer rfp.

Step 306 examines the value of the passed FUNCTION_ID to determine if it is equal to "UNDEFINE." This is because different steps are executed depending on whether a resource is being defined or undefined, which is analogous to erasing the resource. If step 306 determines that the FUNCTION_ID is not "UNDEFINE," flow proceeds to step 326 to determine if the FUNCTION_ID is equal to "DEFINE." If it is not equal to "DEFINE," flow proceeds to step 328 where an error code is set because the FUNCTION_ID must be one of "UNDEFINE" and "DEFINE." In step 328, flow returns to the process which called the process illustrated in FIG. 6.

If the FUNCTION_ID is equal to "DEFINE," memory for a new resource definition data structure is allocated in Step 330 and the address of the new resource definition data structure is saved to the pointer nrfp. Step 332 puts the received values into their corresponding entries in the newly allocated resource definition data structure. Step 334 then puts the pointer to rfp into the pointer to the next RESOURCE DEFINITION in the allocated resource definition data structure. Then step 336 puts the pointer to the newly allocated resource definition data structure in the position where rfp originally was. From step 336, flow returns to the calling process.

If step 306 determines that FUNCTION_ID is equal to "UNDEFINE," the purpose of the resource definition is to prevent a resource definition which has been previously defined from being used again; in effect, deleting a previously defined resource definition. If the FUNCTION_ID is determined to be "UNDEFINE" in step 306, flow proceeds to step 308 where it is determined if the pointer to resource definition is equal to null. If it is equal to null, a resource is trying to be deleted but there has never been a resource defined. Therefore, there is an error and flow proceeds to step 318 where an error code is set and flow returns to the calling process.

If rfp is determined not to be null in step 308, flow proceeds to step 310 where a temporary resource definition data structure, trfp, is created and set equal to the resource definition data structure pointed to by rfp. Step 312 then determines if the RESOURCE_ID in rfp is equal to the RESOURCE_ID which was passed to the process illustrated in FIGS. 6A and 6B. If it is, the resource definition data structure pointed to by the resource definition in the prologue data structure is the resource definition to be deleted. If it is not, flow proceeds to step 314 where it is determined if there is a next resource definition. If there is not, there are no subsequent resource definition data structures and therefore, the resource definition data structure cannot be deleted and an error code is set in step 318. If the pointer to the next resource definition is not null, flow proceeds to step 316 where a pointer PREV stores trfp and the temporary resource definition data structure trfp is set to be equal to the next resource definition data structure pointed to by the next pointer in the current resource definition data structure. Flow then proceeds back to step 312 to determine if the RESOURCE ID in the temporary resource definition data structure is equal to the RESOURCE ID which was passed.

When the RESOURCE ID in the temporary resource definition data structure is determined to be equal to the RESOURCE ID which was passed, the current resource definition data structure is the resource definition data structure to be deleted. Next, the resource specification which was passed is examined to determine if it is equal to null in step 320. If it is not equal to null, there is an attempt to delete a resource but there is also an attempt to define a resource specification. Consequently, an error is set in step 318 and the process returns to the process which called the process illustrated in FIG. 6(A) and 6(B). From step 320, steps 322, 323 and 324 are performed to delete the identified resource specification, connect the link between previous and next Resource Definition data structures, and to delete the identified data structure.

Figure 7B:
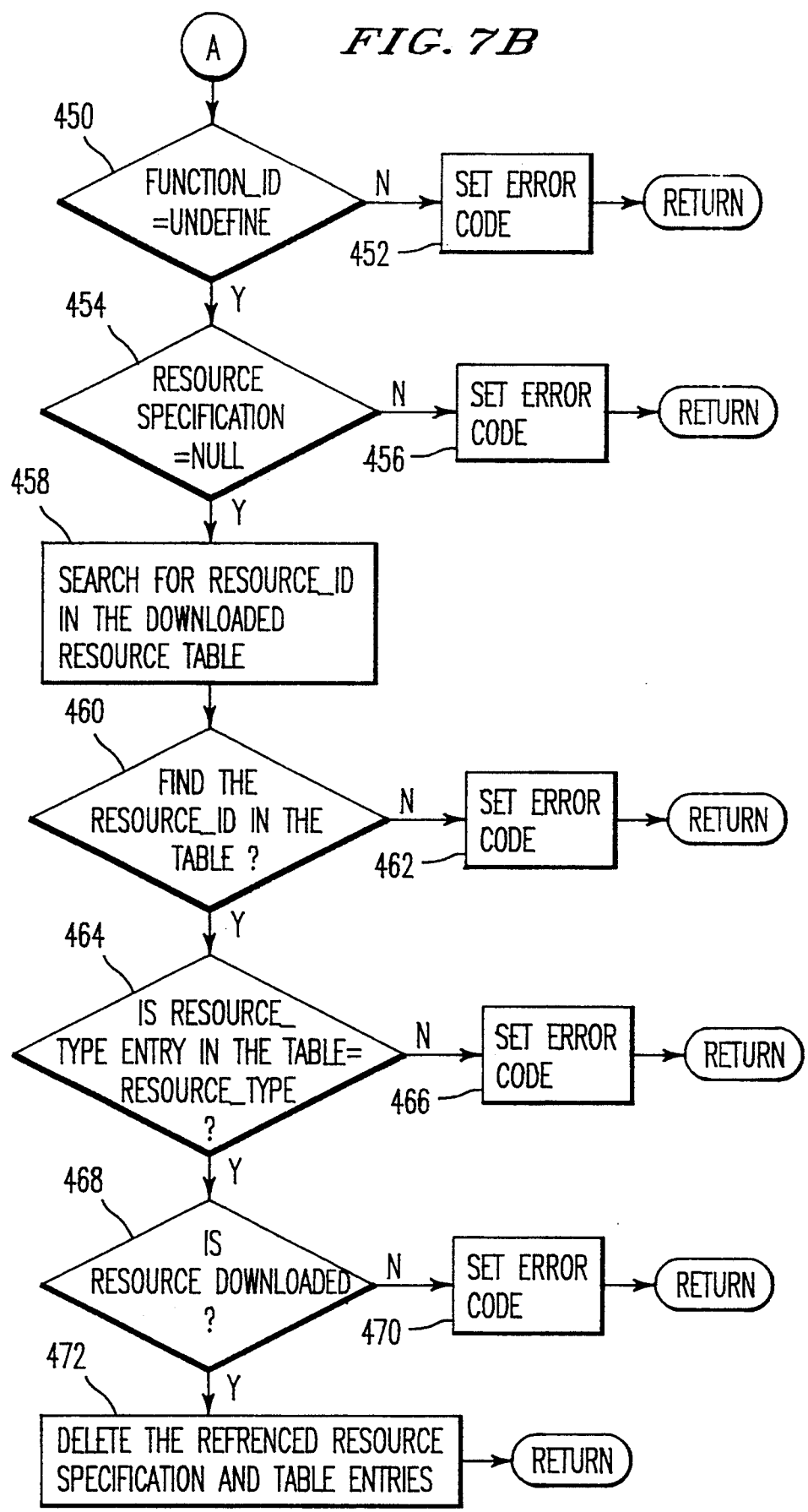

FIGS. 7A and 7B illustrate the process used to handle resource definitions when the resource is at the highest hierarchical level. This process is used to download a resource.

When the RESOURCE DEFINITION structure element is encountered at the highest hierarchical level, a parser parses the input SPDL data stream and identifies the RESOURCE_ID, the RESOURCE_TYPE, the FUNCTION_ID, and the RESOURCE SPECIFICATION. Flow proceeds to step 402 where the FUNCTION_ID is examined to determine if it is equal to "DEFINE." If the FUNCTION_ID is equal to "DEFINE," step 404 searches through the AVAILABLE RESOURCE TABLE for the passed value of the RESOURCE_ID. Step 406 determines if the RESOURCE_ID was found and if it was not, the RESOURCE ID does not exist in the AVAILABLE RESOURCE TABLE and flow proceeds to step 408 where the RESOURCE SPECIFICATION is saved and the memory location at which it is saved is stored. Step 410 determines if the RESOURCE SPECIFICATION saved was successful and if it was not, an error code is set in step 412 and flow returns to the process which called the process illustrated in FIG. 7A.

If the save was successful, flow proceeds to step 414 where the RESOURCE_ID, RESOURCE_TYPE and the memory location to the saved RESOURCE SPECIFICATION are written into the AVAILABLE RESOURCE TABLE. From step 414, flow proceeds to the process which called the process illustrated in FIG. 7A.

If the RESOURCE_ID is found in the AVAILABLE RESOURCE TABLE in step 406, that entry in the AVAILABLE RESOURCE TABLE is to be written over and flow proceeds to step 416 where the resource type in the AVAILABLE RESOURCE TABLE is replaced with the passed value of RESOURCE_TYPE. Step 418 deletes the referenced RESOURCE SPECIFICATION of the AVAILABLE RESOURCE TABLE. Then step 420 saves the RESOURCE SPECIFICATION which has been passed and stores the memory location of the saved RESOURCE SPECIFICATION. If the save is not successful, flow proceeds from step 422 to step 424 where an error code is set after which, flow returns to the parser. If the save was successful, flow proceeds from step 422 to step 426 where the memory location of the saved RESOURCE SPECIFICATION is written into the AVAILABLE RESOURCE TABLE. From step 426, flow proceeds to the parser which called the routine illustrated in FIG. 7A.

If the FUNCTION_ID is not determined to be "DEFINE" in step 402, flow proceeds to process A illustrated in FIG. 7B. In FIG. 7B, step 450 determines if the FUNCTION_ID is equal to "UNDEFINE." If it is not equal to "UNDEFINE," flow proceeds to step 452 where an error code is set and flow returns to the calling process. The error code is set because the FUNCTION_ID must be either "DEFINE" or "UNDEFINE" and since it is neither of these values, there is an error.

When the FUNCTION_ID is determined to be "UNDEFINE," flow proceeds from step 450 to step 454 where the RESOURCE SPECIFICATION which has been passed to the process illustrated in FIGS. 7A and 7B is examined to determine if it is equal to null. If it is not null, there is an error because the resource is being undefined or deleted and therefore the RESOURCE SPECIFICATION must be null and an error code is set in step 456 and flow returns to the calling process.

If the RESOURCE SPECIFICATION is determined to be null in step 454, flow proceeds from step 458 to step 460 where the AVAILABLE RESOURCE TABLE is searched for the RESOURCE ID which has been passed. If the RESOURCE_ID is not found in the table, flow proceeds from step 460 to step 462 where an error code is set because the RESOURCE_ID was not found and flow returns to the calling process.

If the RESOURCE_ID was found in the AVAILABLE RESOURCE TABLE, flow proceeds from step 460 to step 464 to determine if the RESOURCE TYPE entry in the AVAILABLE RESOURCE TABLE is equal to the passed value of RESOURCE_TYPE. If it is not, the entry in the AVAILABLE RESOURCE TABLE does not match the values of the resource trying to be deleted, an error code is set in step 466 and flow returns to the parser. If the RESOURCE TYPE entry in the AVAILABLE RESOURCE TABLE is equal to the passed value of RESOURCE TYPE, flow proceeds to step 468 where the resource is tested to see if it is a downloaded resource. If the resource is downloaded, the process proceeds to step 472 where the reference resource specification and table entries of the RESOURCE ID are deleted. If the resource is determined not to be downloaded, an error code is set in step 470 because there is an attempt to delete a default resource. Flow then returns to the calling process.

Figure 8B:
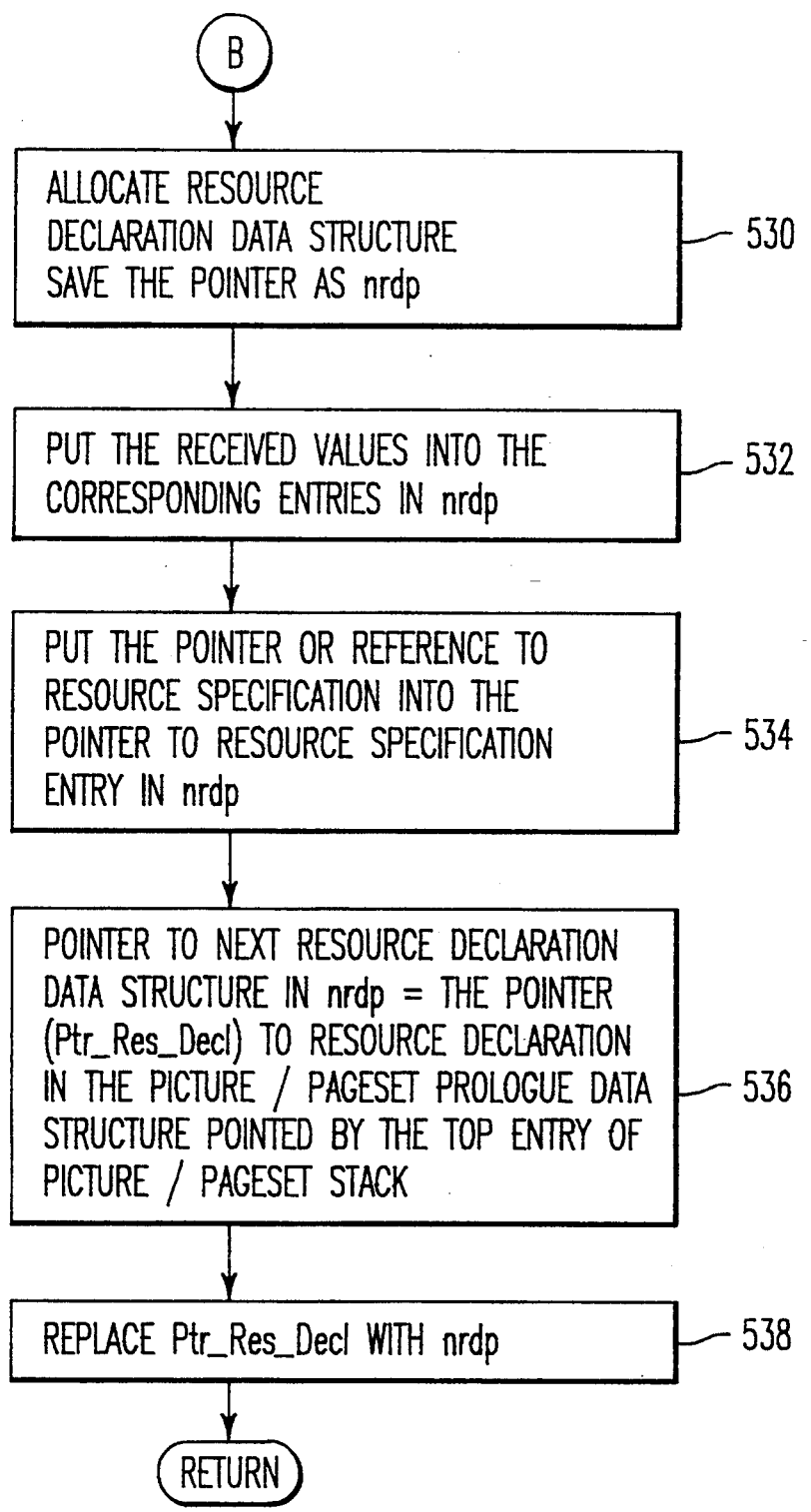
FIGS. 8A(1), 8A(2) and 8B illustrate a process for handling a resource declaration.

FIGS. 8A(1), 8A(2), and 8B illustrate the process used for handling a RESOURCE DECLARATION structure element which is used to declare a resource after the resource has been defined. The process is called after a parser processes the input SPDL data stream and determines that there is a RESOURCE DECLARATION structure element. The parser identifies the INTERNAL_ID, the RESOURCE_ID, and the RESOURCE_TYPE. These values are then passed to the process illustrated in FIGS. 8A(1), 8A(2) and 8B and step 500 sets rfp equal to the resource definition data structure pointed to by the pointer to RESOURCE DEFINITION of the prologue data structure of the top entry of the picture/pageset stack.

Step 502 determines if the pointer to the resource definition is null. If it is null, there are no resource definition data structures created but note that it is possible for a resource specification to have been downloaded. If rfp is not null, there are resource definitions defined and these resource definition data structures must be searched to determine if they contain a RESOURCE ID which matches the RESOURCE_ID of the RESOURCE DECLARATION being processed.

If the RESOURCE ID in the pointed to RESOURCE DEFINITION DATA STRUCTURE is not equal to the passed value of RESOURCE_ID, flow proceeds from step 504 to step 506 where rfp is set equal to the next RESOURCE DEFINITION DATA STRUCTURE. Step 502 then determines if rfp is equal to null. If it is equal to null, all RESOURCE DEFINITION DATA STRUCTURES have been searched and the RESOURCE_ID being processed in the RESOURCE DECLARATION is not in any of the RESOURCE DEFINITION DATA STRUCTURES and flow proceeds to step 516. If step 502 determines that rfp is not equal to null and step 504 determines that the RESOURCE ID in the current RESOURCE DEFINITION DATA STRUCTURE is equal to the passed value of RESOURCE_ID, flow proceeds to step 508 where the RESOURCE TYPE in the current RESOURCE DEFINITION DATA STRUCTURE is examined to determine if it is equal to the passed value of RESOURCE_TYPE. If it is not, the RESOURCE IDs do not match and an error code is set in step 510 and flow returns to the parser.

If the RESOURCE TYPEs match, flow proceeds to step 512 where the FUNCTION ID in the resource definition data structure is examined to determine if it is equal to "UNDEFINE." If the FUNCTION ID is equal to "UNDEFINE," there is an error as the resource being defined has been previously undefined. When this occurs, flow proceeds to step 514 where an error code is set and flow returns to the parser If the FUNCTION ID is not equal to "UNDEFINE," flow proceeds to process B illustrated in FIG. 8B.

If step 502 determines that the current resource definition data structure is null, flow proceeds to step 516 as there is no RESOURCE DEFINITION DATA STRUCTURE which corresponds to the RESOURCE being declared. Therefore, step 516 searches through the AVAILABLE RESOURCE TABLE to determine if there is an entry having a RESOURCE ID corresponding to the passed value of RESOURCE_ID. If there is no entry found in the AVAILABLE RESOURCE TABLE corresponding to the RESOURCE_ID, there is no resource specification corresponding to the resource being declared and an error code is set in step 520 and flow returns to the parser. If an entry having the past RESOURCE_ID is found in the table, the RESOURCE TYPE entry corresponding to the found RESOURCE ID is examined to determine if it is equal to the passed value of RESOURCE_TYPE. If it is not, there is not a match of the type being declared and the type in the AVAILABLE RESOURCE TABLE and an error code is set in step 524. If the entries do match, flow proceeds to process B illustrated in FIG. 8B.

In process B, step 530 allocates a RESOURCE DECLARATION DATA STRUCTURE and the pointer to the RESOURCE DECLARATION DATA STRUCTURE is saved in the variable nrdp. Step 532 then writes the passed values into the corresponding entries of the allocated RESOURCE DECLARATION DATA STRUCTURE.

Step 534 writes a pointer to the RESOURCE SPECIFICATION entry of the allocated RESOURCE DECLARATION DATA STRUCTURE which points to the RESOURCE SPECIFICATION of the corresponding RESOURCE DEFINITION DATA STRUCTURE or the AVAILABLE RESOURCE TABLE. The RESOURCE DEFINITION DATA STRUCTURE is used when a RESOURCE DEFINITION DATA STRUCTURE exists which has the corresponding RESOURCE ID, and RESOURCE TYPE. The AVAILABLE RESOURCE TABLE is used when a RESOURCE DEFINITION DATA STRUCTURE having a corresponding RESOURCE ID is not found.

Step 536 writes the pointer to the NEXT RESOURCE DECLARATION DATA STRUCTURE of the allocated RESOURCE DECLARATION DATA STRUCTURE into the POINTER TO RESOURCE DECLARATION entry in the prologue data structure. Then the original POINTER TO RESOURCE DECLARATION of the prologue data structure is written into the NEXT entry of the allocated RESOURCE DECLARATION DATA STRUCTURE, thereby inserting the newly allocated RESOURCE DEFINITION DATA STRUCTURE between the prologue data structure and the old RESOURCE DECLARATION DATA STRUCTURE.

FIGS. 9A and 9B illustrate the beginning of sample SPDL listings containing textual representations of structural elements within SPDL. It is to be noted that FIGS. 9A and 9B do not illustrate the technical syntax and exact encoding needed in an SPDL document but their purpose is to illustrate, in an easily readable form, SPDL commands which are relevant to the present invention.

Line 602 of FIG. 9A denotes that the listing conforms to SPDL requirements. The RESOURCE DEFINITION command 604 is used to download a RESOURCE DEFINITION into an AVAILABLE RESOURCE TABLE. The RESOURCE DEFINITION 604 contains RESOURCE ID 606, RESOURCE TYPE 608, and RESOURCE SPECIFICATION 610.

FIG. 9B illustrates resources which are contained in a document. Line 611 indicates that the document conforms to SPDL standards and line 612 begins to define a PAGESET 612. The PAGESET 612 contains a PROLOGUE 614 having a RESOURCE element 616 which contains RESOURCE DECLARATIONS 618 and 622 and RESOURCE DEFINITIONS 620 and 624. The PAGESET 612 has a PAGESET BODY 626 which contains a PICTURE 628. The PICTURE 628 contains therein a RESOURCE ELEMENT 630 containing RESOURCE DEFINITION 632, RESOURCE DEFINITION 634, and RESOURCE DECLARATION 636.

FIGS. 10A–10F(2) illustrate the data structures created as the listings of FIGS. 9A and 9B are processed. When the first structure element, SPDL 602, is encountered, PICTURE/PAGESET STACK 700 is created having a single entry 702 with a pointer to a PROLOGUE DATA STRUCTURE 704 and a pointer to a CCI DATA STRUCTURE 706 both pointing to null. A detailed explanation of the picture/pageset stack and prologue data structures is set forth in commonly owned co-pending U.S. patent application Ser. No. 08/087,571 filed on Jul. 2, 1993 and entitled "Method and System to Handle Context of Interpretation in a Document Processing Language."

The RESOURCE DEFINITION structure element 604 causes a resource to be downloaded into an AVAILABLE RESOURCE TABLE 730, because the RESOURCE DEFINITION is at the highest level structure element. The AVAILABLE RESOURCE TABLE 730, as previously described with respect to FIG. 3, has four columns; the first indicating whether a resource is downloaded or default, the second storing the RESOURCE ID, the third indicating the specific type of resource and the fourth pointing to a RESOURCE SPECIFICATION. The RESOURCE ID 606 is written into the RESOURCE ID entry 732, the RESOURCE TYPE 608 is written into the RESOURCE TYPE ENTRY 733, and the RESOURCE SPECIFICATION 610 is written as RESOURCE SPECIFICATION 790 and is pointed to by the pointer 734 in the AVAILABLE RESOURCE TABLE 730. TYPE is then specified as downloaded in entry 731. AVAILABLE RESOURCE TABLE 730 already has an entry for a default resource and uses elements 735, 736, 737 and 738 of the table and points to RESOURCE SPECIFICATIONS 795.

SPDL 611, PAGESET 612, PROLOGUE 614 and RESOURCE 616 are encountered in the listing of FIG. 9B. In the present example, the listings of FIGS. 9A and 9B are part of the same document and the listing of FIG. 9B is processed after the listing of FIG. 9A is processed. For simplicity sake, the PAGESET 612 is assumed to be at level 702 in the PICTURE/PAGESET STACK. However, it is possible that there is an entry in the picture/pageset stack which is below entry 702 illustrated in FIG. 10B. The PROLOGUE DATA 720 is then created. The PROLOGUE DATA STRUCTURE 720 only illustrates the pointer to RESOURCE DEFINITION 721 and the pointer to RESOURCE DECLARATION 722. However, the PROLOGUE DATA STRUCTURE in fact contains all of the elements illustrated in PICTURE/PAGESET PROLOGUE DATA structure 20 illustrated in FIG. 1.

As previously discussed, after a resource is defined or downloaded, to be used during the processing of an SPDL document, it must be declared. RESOURCE DECLARATION 618 performs this type of resource declaration. The RESOURCE DECLARATION 618 declares the RESOURCE SPECIFICATION 790 which was previously defined as a downloaded resource with respect to RESOURCE DEFINITION 604 of FIG. 9A. The RESOURCE DECLARATION element 618 causes the creation of RESOURCE DECLARATION DATA STRUCTURE 740 which is pointed to by pointer 722 of PROLOGUE DATA STRUCTURE 720 and points to RESOURCE SPECIFICATION 790 using pointer 742. As there are no other RESOURCE DECLARATION DATA STRUCTURES at this time, the NEXT pointer in the RESOURCE DECLARATION DATA STRUCTURE 740 points to null.

Figure 10A:
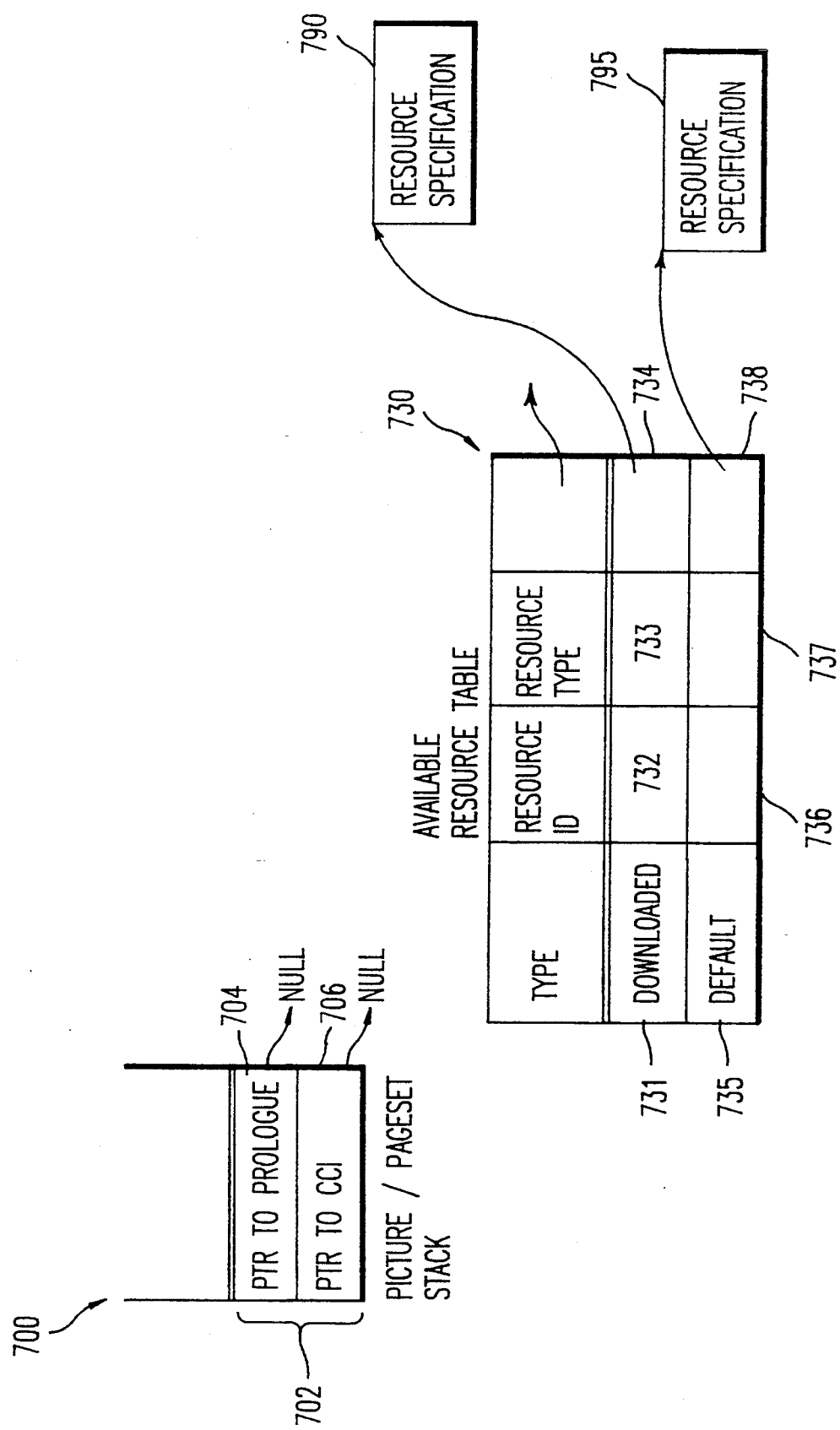
Figure 10B:
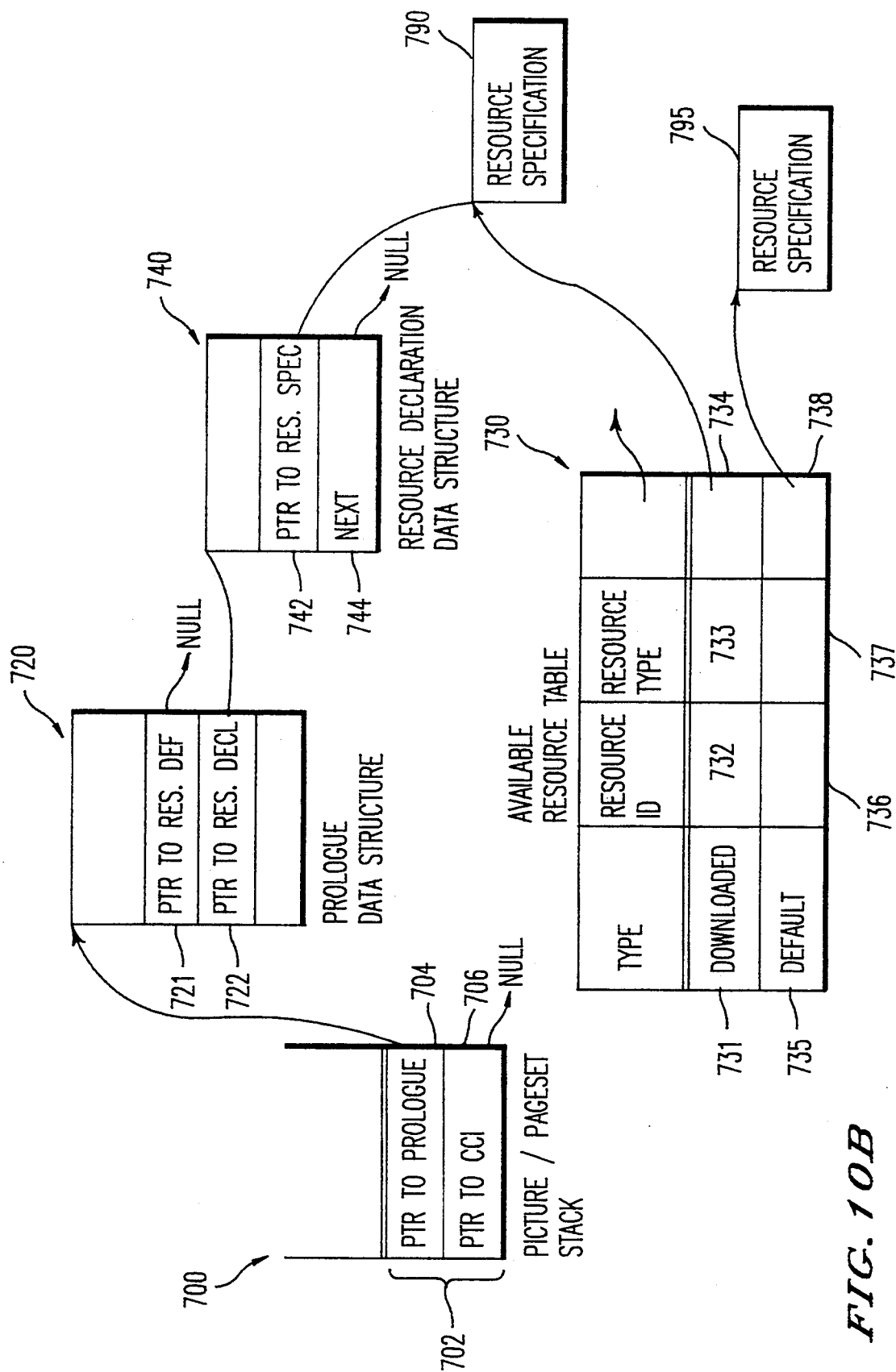
Figure 10C:
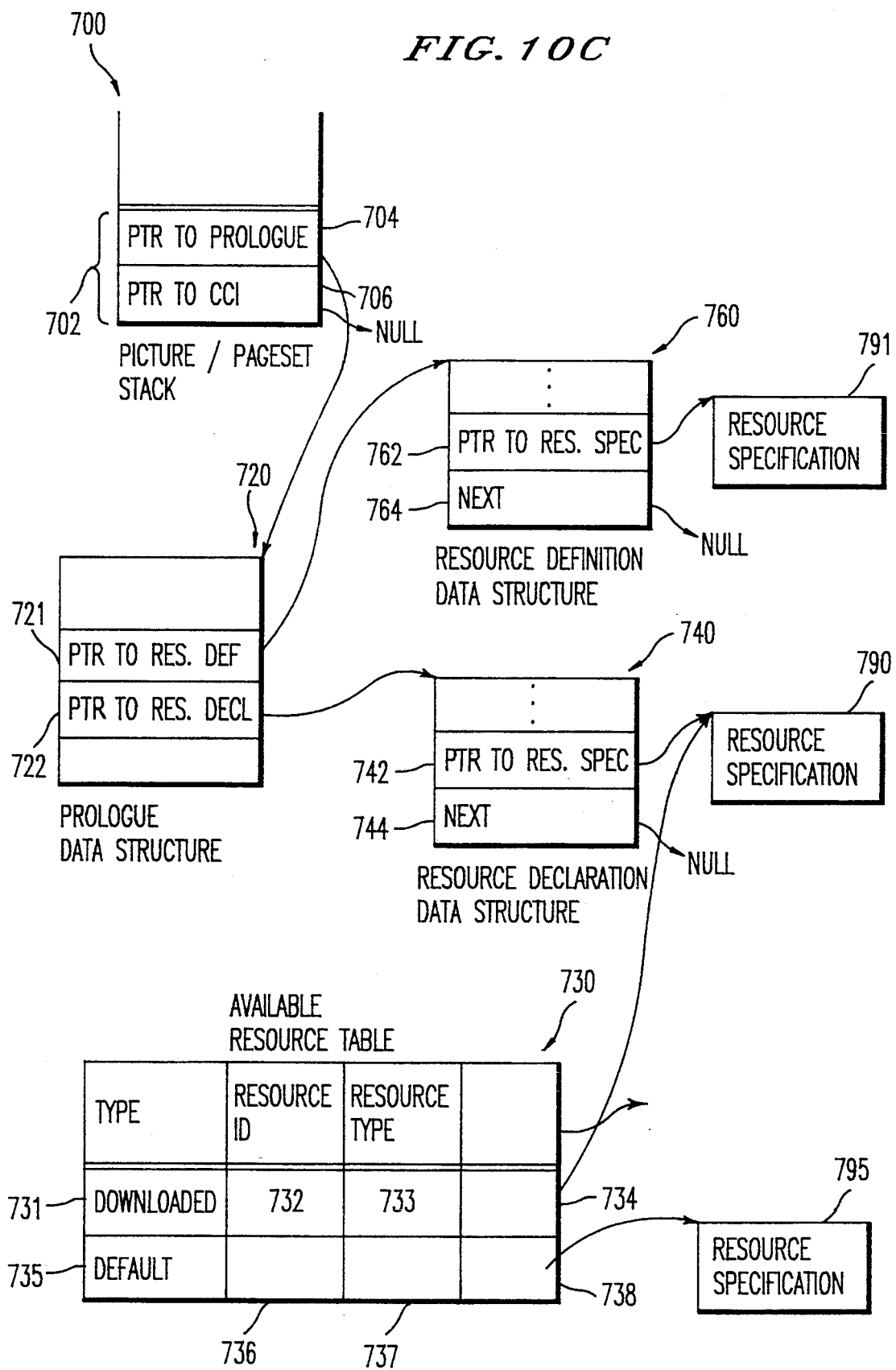

Next, RESOURCE DEFINITION 620 is encountered in FIG. 9B. The RESOURCE DEFINITION 620 causes a RESOURCE DEFINITION DATA STRUCTURE 760 to be created which points to a RESOURCE SPECIFICATION 790 using a POINTER to RESOURCE SPECIFICATION 762, as illustrated in FIG. 10C. The NEXT entry 764 of the RESOURCE DEFINITION DATA STRUCTURE 760 points to null as there are no other RESOURCE DEFINITION DATA STRUCTURES. The RESOURCE DEFINITION element 620 causes the RESOURCE SPECIFICATION 791 to be created but before the RESOURCE SPECIFICATION 791 can be used, it must be declared.

Figure 10D:
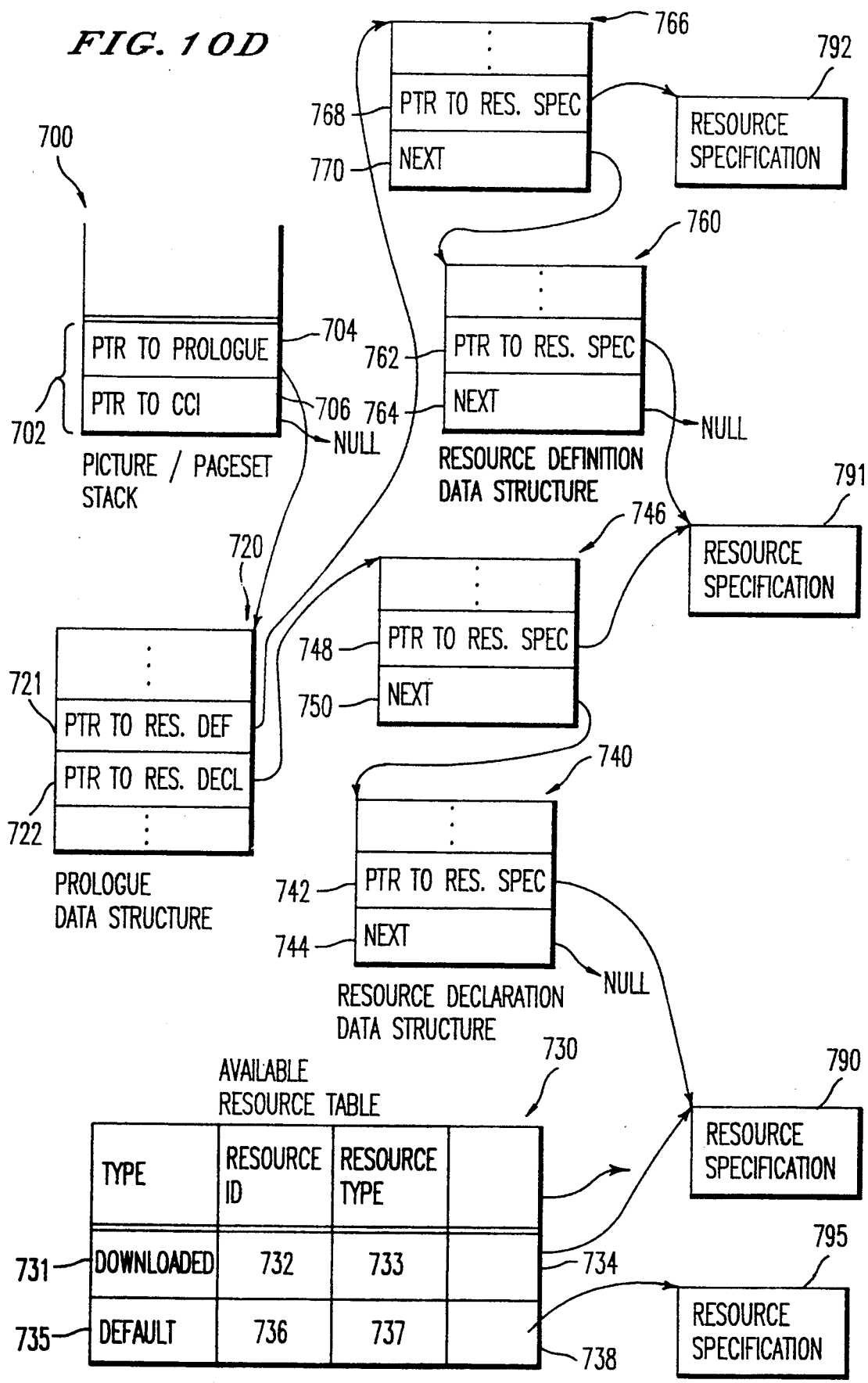

FIG. 10D illustrates the data structures after processing RESOURCE DECLARATION 622 and RESOURCE DEFINITION 624 of FIG. 9B. The RESOURCE DECLARATION element 622 causes the RESOURCE DECLARATION DATA STRUCTURE 746 to be created. The RESOURCE DEFINITION DATA STRUCTURE 746 is inserted between the PROLOGUE DATA. STRUCTURE 720 and the RESOURCE DECLARATION DATA STRUCTURE 740. The RESOURCE DECLARATION DATA STRUCTURE 746 is pointed to by the POINTER to RESOURCE DECLARATION 722 and points, using the NEXT entry 750, to the RESOURCE DECLARATION DATA STRUCTURE 740.

RESOURCE DEFINITION 624 of FIG. 9B causes the RESOURCE DEFINITION DATA STRUCTURE 766 to be created which points to RESOURCE SPECIFICATION 792. The RESOURCE DEFINITION DATA STRUCTURE 766 is inserted between the prologue data structure 720 and the RESOURCE DEFINITION DATA STRUCTURE 760.

Next, PAGESET body 626, PICTURE 628, and RESOURCE element 630 are encountered in FIG. 9B. The PAGESET BODY 626 causes entry 708 to be placed on the PICTURE/PAGESET STACK 700, as illustrated in FIGS. 10E(1) and 10E(2). The PIC- TURE/PAGESET STACK has pointer 710 point to a PROLOGUE DATA STRUCTURE 725. The pointer to CCI data structure 712 points to null as a token sequence element is not being processed. When PROLOGUE DATA STRUCTURE 725 is created, its pointers are the same as the pointers of PROLOGUE DATA STRUCTURE 720. For this reason, the POINTER to RESOURCE DEFINITION 726 initially points to RESOURCE DEFINITION DATA STRUCTURE 766 and the POINTER to RESOURCE DECLARATION 727 points to RESOURCE DECLARATION DATA STRUCTURE 746, as illustrated in FIGS. 10F(1) and 10F(2).

The RESOURCE 630 contains RESOURCE DEFINITION 632, RESOURCE DEFINITION 634, and RESOURCE DECLARATION 636. The RESOURCE DEFINITION 632 causes the RESOURCE DEFINITION DATA STRUCTURE 722 to be inserted between the PROLOGUE DATA STRUCTURE 725 and the RESOURCE DEFINITION DATA STRUCTURE 766. Then, the RESOURCE DEFINITION 634 causes the RESOURCE DEFINITION DATA STRUCTURE 778 to be inserted between the PROLOGUE DATA STRUCTURE 725 and the RESOURCE DEFINITION DATA STRUCTURE 772. Also, the RESOURCE DECLARATION 636 causes the RESOURCE DECLARATION DATA STRUCTURE 752 to be inserted between the PROLOGUE DATA. STRUCTURE 725 and the RESOURCE DECLARATION DATA STRUCTURE 746.

Figure 11:
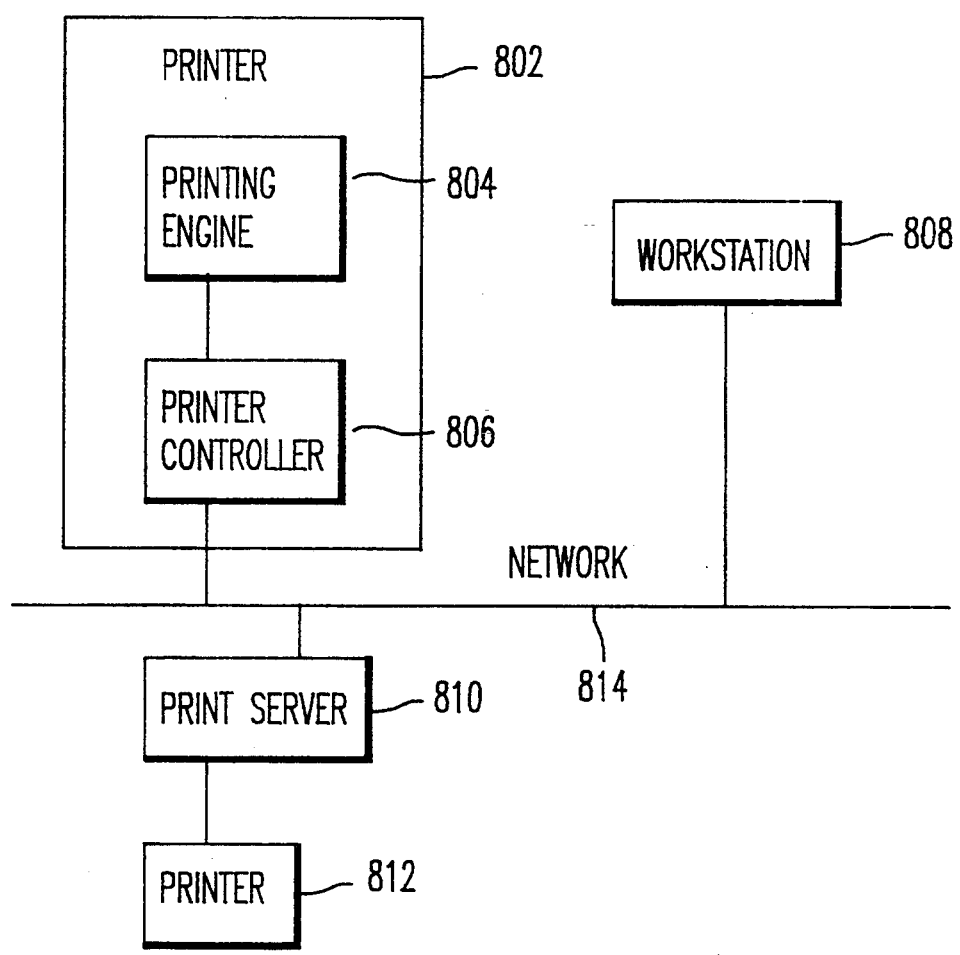
FIG. 11 illustrates a computer network for employing the present invention.

FIG. 11 illustrates a network and various devices connected thereto, any of which can employ the present invention. Connected to the network 814 is a printer 802 having a printer controller 806 and a printing engine 804. Workstation 808 is also connected to the network along with print server 810 connected to printer 812.

Figure 12:
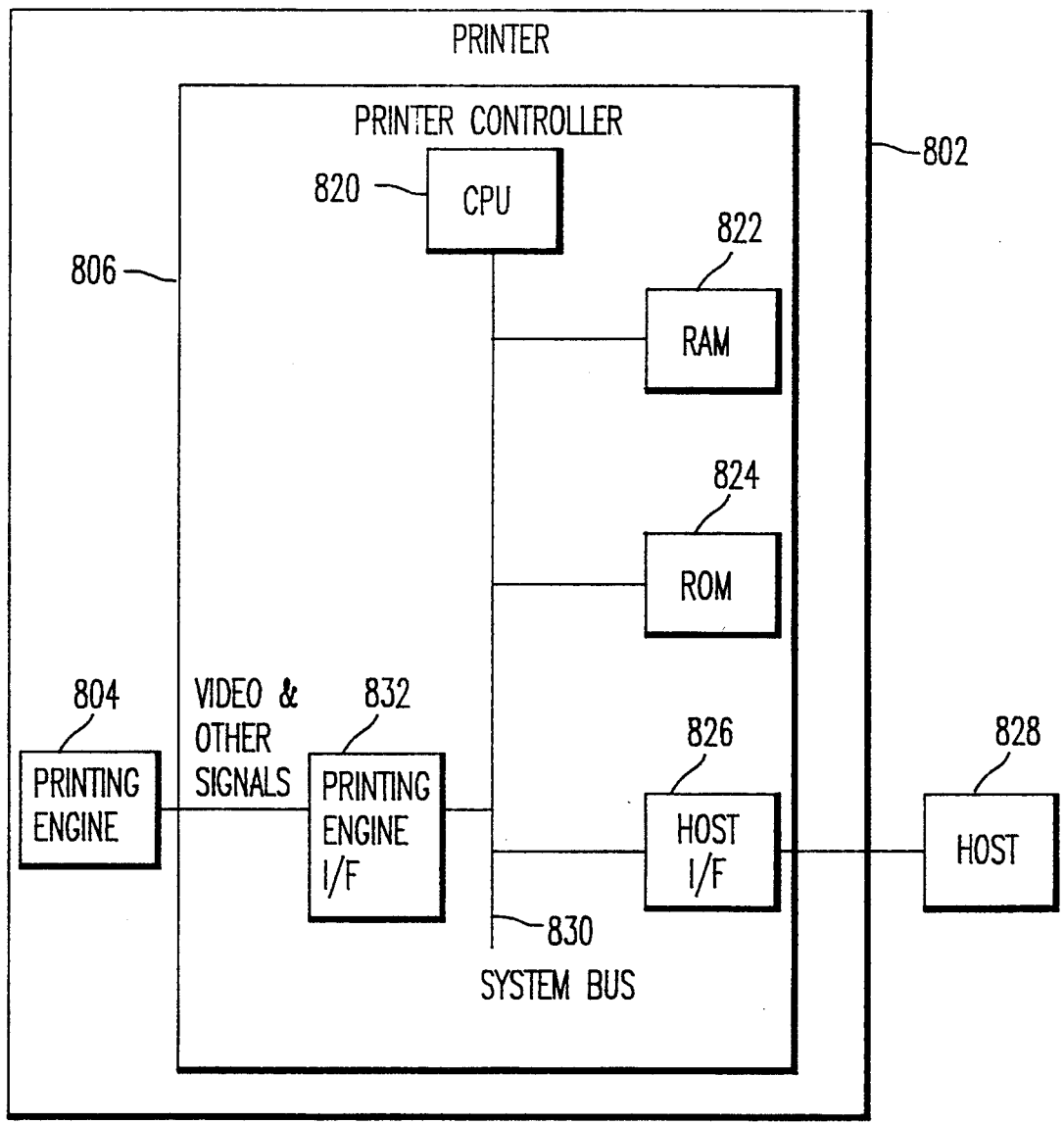
FIG. 12 illustrates a printer controller for employing the present invention.

FIG. 12 illustrates the details of the printer controller 806 of printer 802. The printer controller is connected to a host 828 through a host interface 826. Host 828 can be any computer and could, for example be a workstation 808. The workstation 808 can be connected to host 828 through the network 814, a serial printer cable, or a parallel printer cable, for example. The printer controller also contains a CPU 820, RAM 822, ROM 824 embodying the process of the present invention, a printing engine interface 832, and a system bus 830 connecting the elements of the printer controller. The printing engine interface 832 outputs rasterized image data in the form of video and other signals to the printer engine 804.

Figure 13:
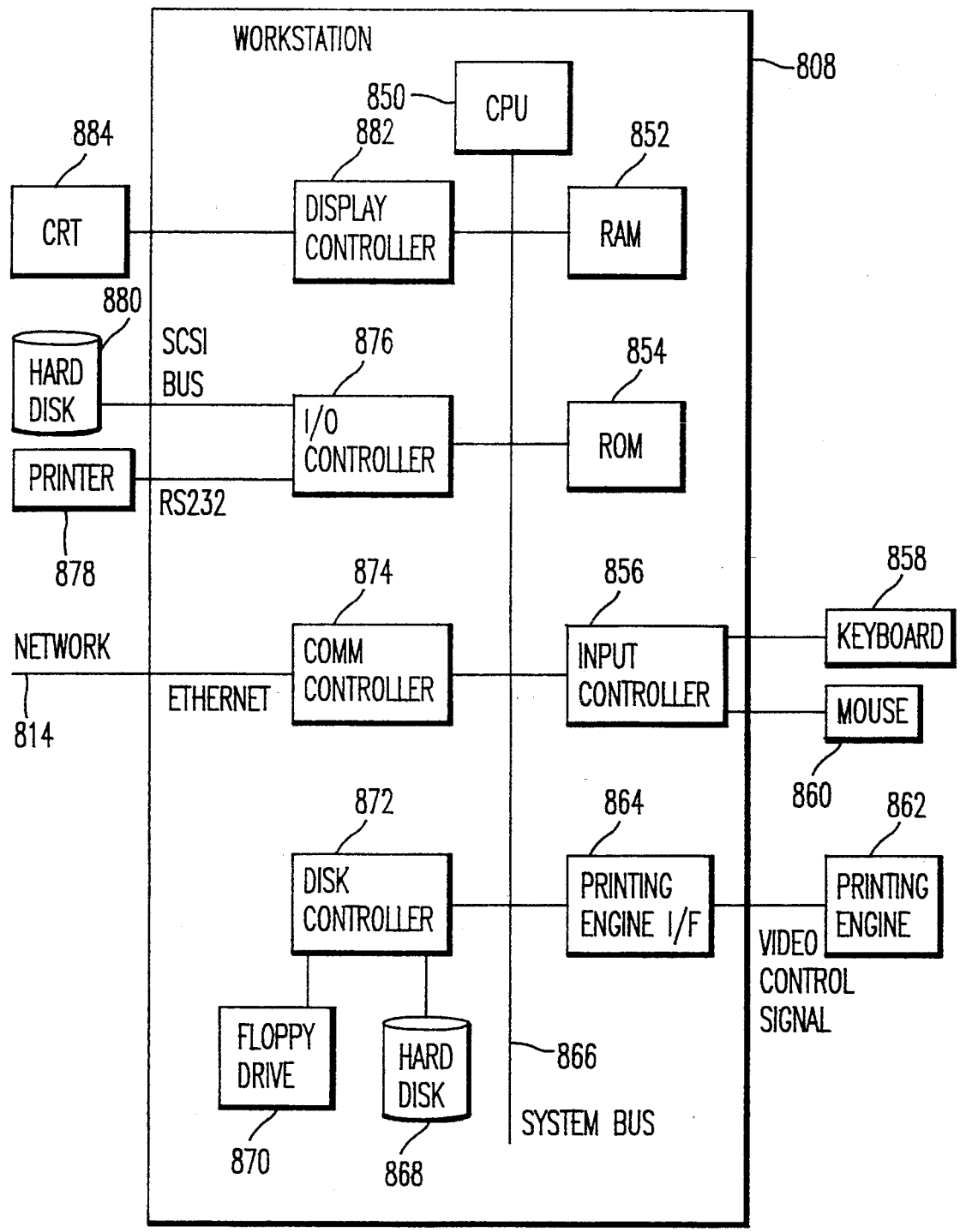
FIG. 13 illustrates a workstation for employing the present invention.

FIG. 13 illustrates the makeup of workstation 808. Workstation 808 contains CPU 850, RAM 852, ROM 854, input controller 856 connected to a keyboard 858 and mouse 860. A printing engine interface is connected directly to a printing engine 862 which receives video and control signals for rasterized image data transmitted by the printer ,engine interface 864. The workstation further contains a disk controller 872 connected to a hard disk 868 and floppy drive 870, a communication controller 874 for connection to the network 814 which can be for example, an Ethernet TM network, an I/O controller 876 connected to an external hard disk 880 through a SCSI bus, for example, and a printer 878, connected through an RS-232 cable, for example. The workstation also contains a display controller 882 connected to a CRT 884. A system bus 866 connects the elements within the workstation.

An SPDL file to be processed and printed can be directly created by workstation 808 or can be first created by workstation 808 and then stored in either of the hard disks 868 or 880, the floppy drive 870 or the RAM 852 for example. The SPDL file can then be processed for printing by the CPU 850 by processing the SPDL file into rasterized image data which is sent through bus 866 through printer engine interface 864 and finally to printing engine 862 in the form of video and control signals so the image data can be printed on printing engine 862.

Figure 14:
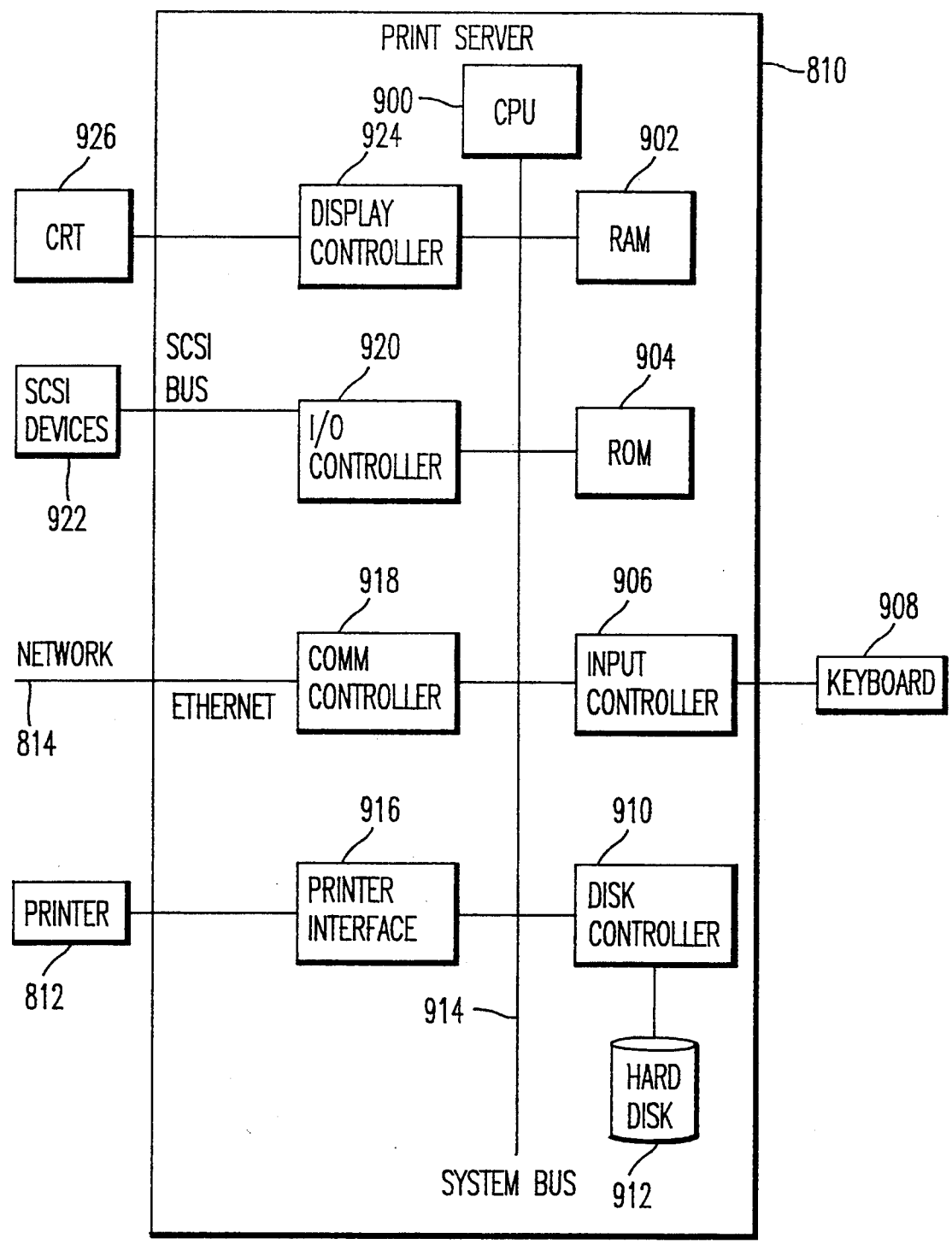
FIG. 14 illustrates a print server for employing the present invention.

The print server 810 illustrated in FIG. 14 has a basic makeup very similar to workstation 808. The print server 810 receives an SPDL file sent over the network 814 and received by communication controller 918. The CPU 900 determines whether the received file is in a binary or clear text SPDL format or some other encoding format according to the process of the present invention. Next, the file is processed by the CPU and sent over system bus 914 to printer interface 916 to printer 812. The CPU 900 can process the document into different formats. For example, the SPDL document can be processed into a PostScript ® representation and transmitted to a printer 812 which would be PostScript ® compatible. Alternatively, the CPU 900 can process the SPDL file into one of the escape sequence type of languages, such as those that are native to the Hewlett Packard (HP) Laserjet ® series of printers (e.g. PCL) and therefore, it can be assumed in this circumstance printer 812 would be HP Laserjet ® compatible. It is also possible for the CPU to process the SPDL document into a format used by raster capable printers such as dot matrix, inkjet, or thermal printers, or any other type of raster capable printer. It is also possible that the CPU 900 processes the SPDL file into a raster image, with the raster data then being sent to a printer engine within printer 812.

Obviously, numerous modifications and variations of the present invention are possible in light of the above teachings. For example, the present invention is not limited to any specific syntax of a page description language but can be used with a page description language which accomplishes the same functions as described in the specification. Additionally, there is no requirement to have an entry in the CCI DATA STRUCTURE for the POINTER to RESOURCE DECLARATION. It is therefore to be understood that in the scope of the appended claims, the invention may be practiced otherwise than as specifically described herein.

What is claimed as new and desired to be secured by Letters Patent of the United States is:

1. A method for implementation in a computer of processing a hierarchically structured document, comprising the steps of:
creating a data structure for keeping track of hierarchical levels of the document;
inputting an element indicating a beginning of a hierarchical level A of the document;
creating a plurality of references for an entry A in said data structure for keeping track of hierarchical levels, said plurality of references for the entry A being used to keep track of parameters of the hierarchical level A of said document including a reference used for keeping track of declared resources which are used during processing of the document;

inputting an element at the hierarchical level A declaring that a first predefined resource is to be used during processing of the document;

changing the reference used for keeping track of declared resources to refer to said first predefined resource;

inputting an element indicating a beginning of a hierarchical level B of the document which is below the hierarchical level A in the hierarchical structure of the document;

creating a plurality of references for an entry B in said data structure for keeping track of hierarchical levels, the entry B being different from the entry A in said data structure for keeping track of hierarchical levels, said plurality of references for the entry B being used to keep track of parameters of the hierarchical level B of said document including a reference used for keeping track of declared resources which are used during processing of the hierarchical level B of the document, said plurality of references for the entry B being equal to said plurality of references for the entry A when said plurality of references for the entry B are created;

inputting an element at the hierarchical level B declaring that a second predefined resource is to be used during processing of the hierarchical level B, in addition to the first predefined resource;

changing the reference used for keeping track of declared resources for the entry B to refer first to said second predefined resource and subsequently to said first predefined resource; and accessing said predefined resources by using first the reference to the second predefined resource and if a desired resource is not found, using subsequently the subsequent reference to the first predefined resource, without referring to said plurality of references for the entry A.

2. A method according to claim 1, wherein:
the predefined resources are defined by performing the steps of:
inputting an element at the hierarchical level A indicating a first resource is to be defined;
defining said first resource in order to create the first predefined resource;
changing a reference of said plurality of references used to keep track of defined resources for said entry A of the data structure for keeping track of hierarchical levels to refer to said first resource which has been defined;
inputting an element at the hierarchical level B indicating a second resource is to be defined;
defining said second resource in order to create the second predefined resource; and
changing a reference of said plurality of references used to keep track of defined resources for said entry B of the data structure for keeping track of hierarchical levels to refer first to said second resource which has been defined and subsequently to said first resource which has been defined, and wherein:
said steps of changing the reference used for keeping track of the declared resources determine a location of the declared resources using the references used to keep track of defined resources.

3. A method according to claim 2, wherein:
said references used to keep track of declared resources and said references used to keep track of defined resources refer to data structures which include a field for a name of the resources and a reference to a specification of the resources.

4. A method according to claim 1, wherein:
said references used to keep track of declared resources refer to data structures which include a field for a name of the resources and a reference to a specification of the resources.

5. A method according to claim 1, wherein said accessing step is performed when a content portion of the hierarchical level B is processed and comprises:
copying the reference for the level B to a content resource reference for the hierarchical level B of the document which is used when content at the hierarchical level B of the document is being processed;
accessing one of said predefined resources by searching through the predefined resources of said document by using first the content resource reference which refers to the second predefined resource and if a desired resource is not found, using subsequently the subsequent reference to the first predefined resource, without referring to said plurality of references for the entry A.

6. A method according to claim 1, wherein said step of creating a data structure for keeping track of hierarchical levels of the document creates a stack and each of said created entries in the data structure for keeping track of hierarchical levels of the document is a level in said stack.

7. A method according to claim 6, wherein said accessing step is performed without referring to said level A of the stack.

8. A method according to claim 1, wherein said accessing step is performed without referring to the entry A of the data structure for keeping track of hierarchical levels.

9. An apparatus for processing a hierarchically structured document, comprising:
means for creating a data structure for keeping track of hierarchical levels of the document;
means for inputting an element indicating a beginning of a hierarchical level A of the document;
means for creating a plurality of references for an entry A in said data structure for keeping track of hierarchical levels, said plurality of references for the entry A being used to keep track of parameters of the hierarchical level A of said document including a reference used for keeping track of declared resources which are used during processing of the document;
means for inputting an element at the hierarchical level A declaring that a first predefined resource is to be used during processing of the document;
means for changing the reference used for keeping track of declared resources to refer to said first predefined resource;
means for inputting an element indicating a beginning of a hierarchical level B of the document which is below the hierarchical level A in the hierarchical structure of the document;
means for creating a plurality of references for an entry B in said data structure for keeping track of hierarchical levels, the entry B being different from the entry A in said data structure for keeping track of hierarchical levels, said plurality of references for the entry B being used to keep track of parameters of the hierarchical level B of said document including a reference used for keeping track of declared resources which are used during processing of the hierarchical level B of the document, said plurality of references for the entry B being equal to said plurality of references for the entry A when said plurality of references for the entry B are created;

means for inputting an element at the hierarchical level B declaring that a second predefined resource is to be used during processing of the hierarchical level B, in addition to the first predefined resource;

means for changing the reference used for keeping track of declared resources for the entry B to refer first to said second predefined resource and subsequently to said first predefined resource; and means for accessing said predefined resources by using first the reference to the second predefined resource and if a desired resource is not found, using subsequently the subsequent reference to the first predefined resource, without referring to said plurality of references for the entry A.

10. An apparatus according to claim 9, wherein:

the predefined resources are defined by:

means for inputting an element at the hierarchical level A indicating a first resource is to be defined;

means for defining said first resource in order to create the first predefined resource;

means for changing a reference of said plurality of references used to keep track of defined resources for said entry A of the data structure for keeping track of hierarchical levels to refer to said first resource which has been defined;

means for inputting an element at the hierarchical level B indicating a second resource is to be defined;

means for defining said second resource in order to create the second predefined resource; and means for changing a reference of said plurality of references used to keep track of defined resources for said entry B of the data structures for keeping track of hierarchical levels to refer first to said second resource which has been defined and subsequently to said first resource which has been defined, and wherein:

said means for changing the reference used for keeping track of the declared resources determines a location of the declared resources using the references used to keep track of defined resources.

11. An apparatus according to claim 10, wherein:

said references used to keep track of declared resources and said references used to keep track of defined resources refer to delta structures which include a field for a name of the resources and a reference to a specification of the resources.

12. An apparatus according to claim 9, wherein:

said references used to keep track of declared resources refer to data structures which include a field for a name of the resources and a reference to a specification of the resources.

13. An apparatus according to claim 9, wherein said accessing means accesses said predefined resources when a content portion of the hierarchical level B is processed and comprises:

means for copying the reference for the level B to a content resource reference for the hierarchical level B of the document which is used when content at the hierarchical level B of the document is being processed; and means for accessing one of said predefined resources by searching through the predefined resources of said document by using first the content resource reference which refers to the second predefined resource and if a desired resource is not found, using subsequently the subsequent reference to the first predefined resource, without referring to said plurality of references for the entry A.

14. An apparatus according to claim 9, wherein said means for creating a data structure for keeping track of hierarchical levels of the document creates a stack and each of said created entries in the data structure for keeping track of hierarchical levels of the document is a level in said stack.

15. An apparatus according to claim 14, wherein said means for accessing operates without referring to said level A of the stack.

16. An apparatus according to claim 9, wherein said means for accessing operates without referring to the entry A of the data structure for keeping track of hierarchical levels.

* * * * *

UNITED STATES PATENT AND TRADEMARK OFFICE
CERTIFICATE OF CORRECTION

PATENT NO. : 5,446,837
DATED : August 29, 1995
INVENTOR(S) : Tetsuro MOTOYAMA, et al.

It is certified that error appears in the above-indentified patent and that said Letters Patent is hereby corrected as shown below:

On the title page, Item [63] and Column 1, Line 20, the fourth listed Serial Number should read:

--876,251--

Signed and Sealed this

Fourteenth Day of November, 1995

Attest:

BRUCE LEHMAN

*Attesting Officer*     *Commissioner of Patents and Trademarks*